(12) United States Patent
Cullum

(10) Patent No.: US 11,809,864 B2
(45) Date of Patent: Nov. 7, 2023

(54) PROCESS FOR EVALUATING SOFTWARE ELEMENTS WITHIN SOFTWARE

(71) Applicants: Riccardo Poli, Cambridge (GB); Stephen Cullum, Cambridge (GB)

(72) Inventor: Stephen Cullum, Cambridge (GB)

(73) Assignees: Riccardo Poli, Cambridge (GB); Stephen Cullum, Cambridge (GB)

( * ) Notice: Subject to any disclaimer, the term of this patent is extended or adjusted under 35 U.S.C. 154(b) by 91 days.

(21) Appl. No.: 17/421,713

(22) PCT Filed: Jan. 15, 2020

(86) PCT No.: PCT/GB2020/050079
§ 371 (c)(1),
(2) Date: Jul. 8, 2021

(87) PCT Pub. No.: WO2020/148534
PCT Pub. Date: Jul. 23, 2020

(65) Prior Publication Data
US 2022/0083333 A1    Mar. 17, 2022

(30) Foreign Application Priority Data
Jan. 18, 2019   (GB) .................................... 1900746

(51) Int. Cl.
*G06F 8/75* (2018.01)
*G06F 8/71* (2018.01)
*G06F 8/74* (2018.01)
*G06F 8/77* (2018.01)

(52) U.S. Cl.
CPC .................. *G06F 8/75* (2013.01); *G06F 8/71* (2013.01); *G06F 8/74* (2013.01); *G06F 8/77* (2013.01)

(58) Field of Classification Search
CPC ..... G06F 8/75; G06F 8/71; G06F 8/74; G06F 8/77
USPC ........................................................ 717/101
See application file for complete search history.

(56) References Cited

U.S. PATENT DOCUMENTS 7,689,394 B2 * 3/2010 Furem .................... E02F 9/267
                                                          703/8
2013/0311968 A1   11/2013 Manoj

FOREIGN PATENT DOCUMENTS

EP            0775335 B1    8/1998

* cited by examiner

Primary Examiner — John Q Chavis
(74) Attorney, Agent, or Firm — SZDC LAW P.C.

(57) ABSTRACT

There is provided a process for evaluating software comprising extracting data (12) relating to metrics from a plurality of software elements (10), each metric representing a dimension of a first reference system, using the extracted data to create a second reference system (16) based on variance in the extracted data, calculating the position of each software element in the second reference system and displaying the position of each software element in the second reference system in a maximum of three dimensions thereby to show in a graphical form the inter-relationship of the software elements to each other. The position of each software element in the second reference system (16) retains the extracted data for examination.

9 Claims, 14 Drawing Sheets

PROCESS FOR EVALUATING SOFTWARE ELEMENTS WITHIN SOFTWARE

This application is the National Stage Application of PCT/GB2020/050079, filed on Jan. 15, 2020, which claims priority to Great Britain Patent Application No. GB 1900746.7, filed on Jan. 18, 2019, which is incorporated by reference for all purposes as if fully set forth herein.

FIELD OF THE INVENTION

The invention relates to a process for evaluating software elements within software, particularly software that has been modified many times by different parties.

BACKGROUND TO THE INVENTION

Source code within software is often developed and updated over many years, using large teams of programmers that change over time. Understanding the role and interaction of multiple different software elements, or artefacts, within a large software program is difficult due to the large amounts of code and the complexity of the interactions between different software elements. Old code may be taken over by a different software team and the impact of changes code in one software element throughout the software not be fully understood, leading to unintended consequences for the operation of the software.

During ongoing development, programmers can find it hard to explain in a simple way to end users of the software why one element of software is problematic and is affecting the development schedule. This communication gap leads to unrealistic expectations of what has been agreed between the programmer and the end user.

SUMMARY OF THE INVENTION

In accordance with one aspect of the invention, there is provided a process for evaluating software comprising:
 (i) extracting data relating to metrics from a plurality of software elements, each metric representing a dimension of a first reference system;
 (ii) using the extracted data to create a second reference system based on variance in the extracted data;
 (iii) calculating the position of each software element in the second reference system; and
 (iv) displaying the position of each software element in the second reference system in a maximum of three dimensions thereby to show in a graphical form the inter-relationship of the software elements to each other. The second reference system is known as a 'software universe' with locations of software elements in the software universe termed 'stars'. The process evaluates coded properties of individual software elements relative to each other en masse and allows the inter-relationship of the different software elements to be readily understood, the graphical representation providing a visual representation of differences of each software element from the average of the group.

The software elements typically form constituents of a large piece of software that will often have been developed over several years by many different individuals. These elements are extracted from different architectural levels within the software representing the whole product, various sub projects, entities such as classes or interfaces and behavioural elements such as methods, properties and constructors. Selected metrics describing the code of the software elements can be extracted, the same metrics being extracted for all software elements, or all metrics that are available can be extracted.

Preferably the origin of the second reference system represents an average of the software elements from which the data is extracted.

The variance is preferably assessed by undertaking principal component analysis where the selected metrics of each software element are analysed relative to the selected metrics of the combination of all the other software elements as to determine variance. This is equivalent to rotating the first reference system so that each axis captures the most variance in the extracted data. The principal component analysis weights each software metric according to its covariance with all other software metrics. The number of metrics available normally determines the number of dimensions produced by undertaking principal component analysis.

Preferably two or three of the dominant dimensions achieved from principal component analysis are used to display each software element in the second reference system. The graphical representation of the position of the software elements in 2D or 3D is readily understandable to a technical or non-technical user.

The position of each software element in the second reference system preferably retains the extracted data describing the different types of metrics so as to allow examination of the underlying software properties after the second reference system has been created.

The extracted data may be stored in one or more archives before the second reference system is created.

The extracted data may be standardised to ensure each metric provides a similar contribution to the assessment of variance. This ensures that metric ranges with a large variance do not dominate.

The method may produce a static graph in three dimensions which is navigable to allow investigation of individual software elements positioned in the second reference system. This allows a human user to investigate the underlying coding properties that have caused a software element to be located in a certain position.

The method may further comprise undertaking a dynamic analysis of changes in software over time. For the dynamic analysis, one or more thresholds may be set and an alert generated when the threshold(s) is exceeded. This provides an automatic way to identify issues with code quality over time.

Software entropy refers to the tendency for software, over time, to become difficult and costly to maintain. An entropy repository is a data structure allowing this disorganisation to be measured. Dynamic analysis may use one or more entropy repositories to monitor, over time, movement of software elements within the second reference system.

The method may further comprise calculating preference scores to allow extracted metric data to be modified to align with what a client perceives to be desirable and less desirable properties. This enables the temporal dynamics of the software elements of interest in the second reference system to be biased towards areas of interest to the client. Calculation of the preference scores may be undertaken using weighted ranking techniques, Machine Learning or alternative quantitative methods.

The preference scores may be used to generate a single value associated with each change in position of a software element in the second reference system so as to readily understand whether movement of a software element in the second reference system due to programming changes is beneficial or not to the overall quality of the software of which the software element forms a part.

The process may take place on a processor or a computing device.

The invention may further lie in a computer program comprising programmable means to implement a process according to any of the preceding claims.

The invention will now be described, by way of example, with reference to the accompanying drawings in which.

Figure 9:
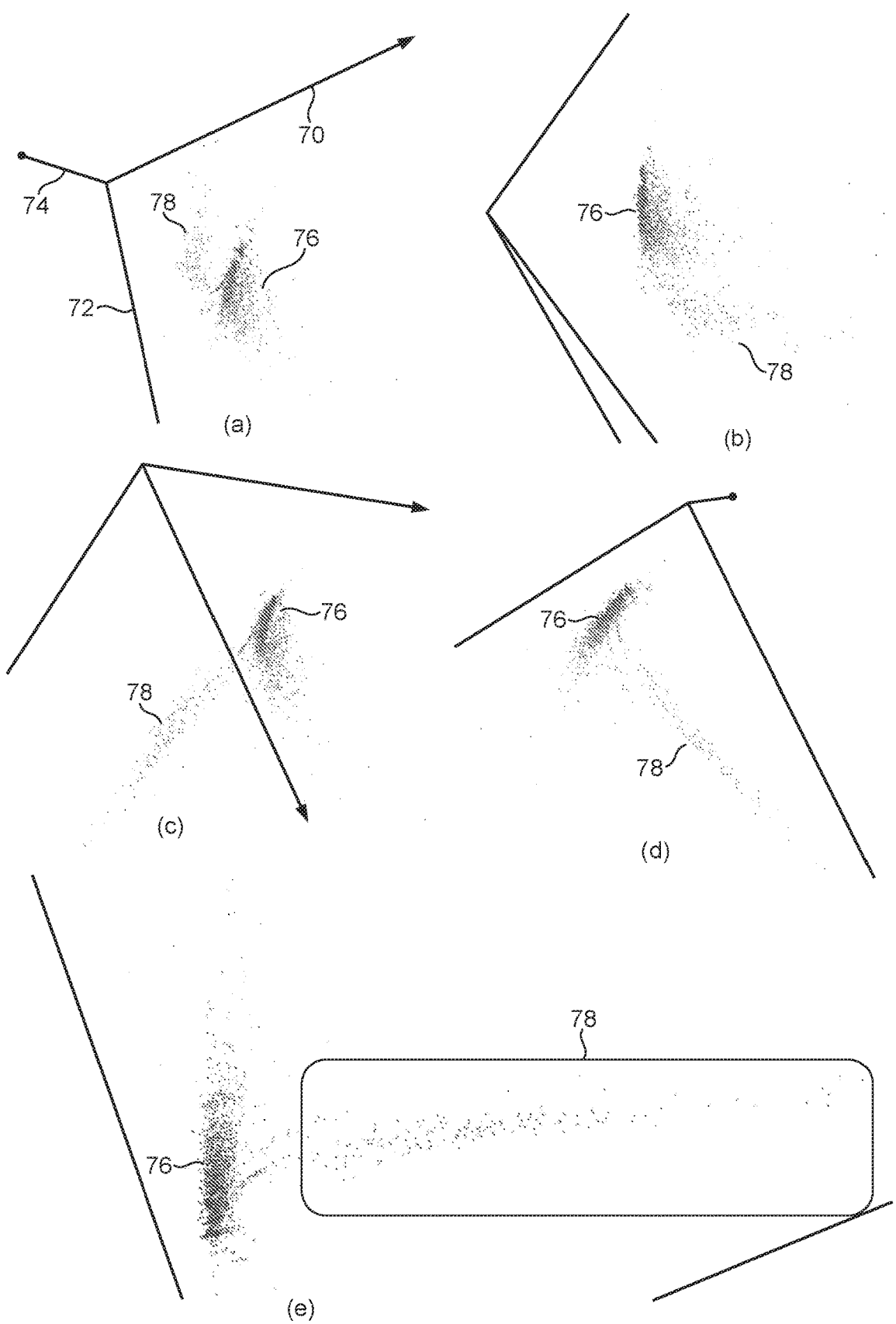
Figure 10:
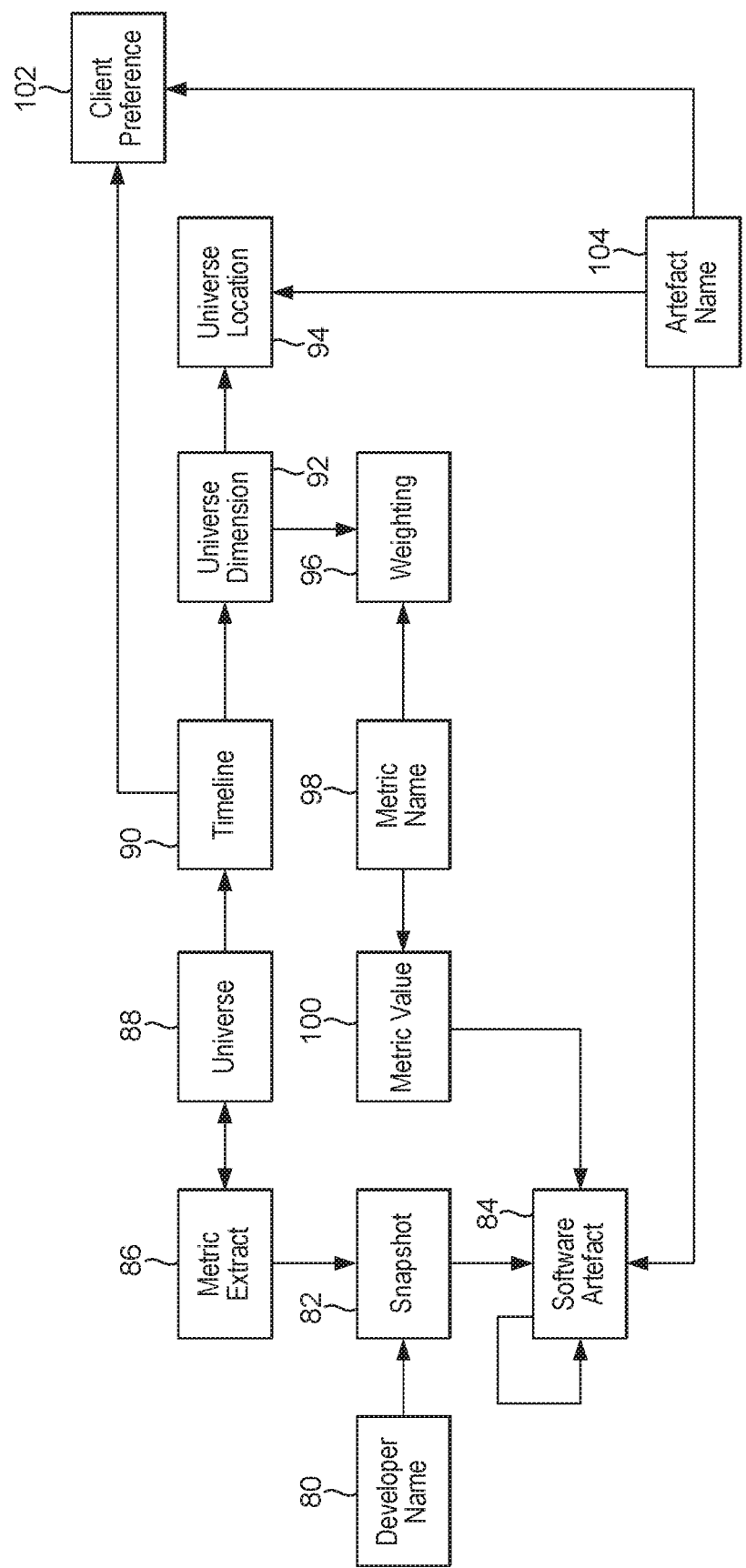
Figure 11:
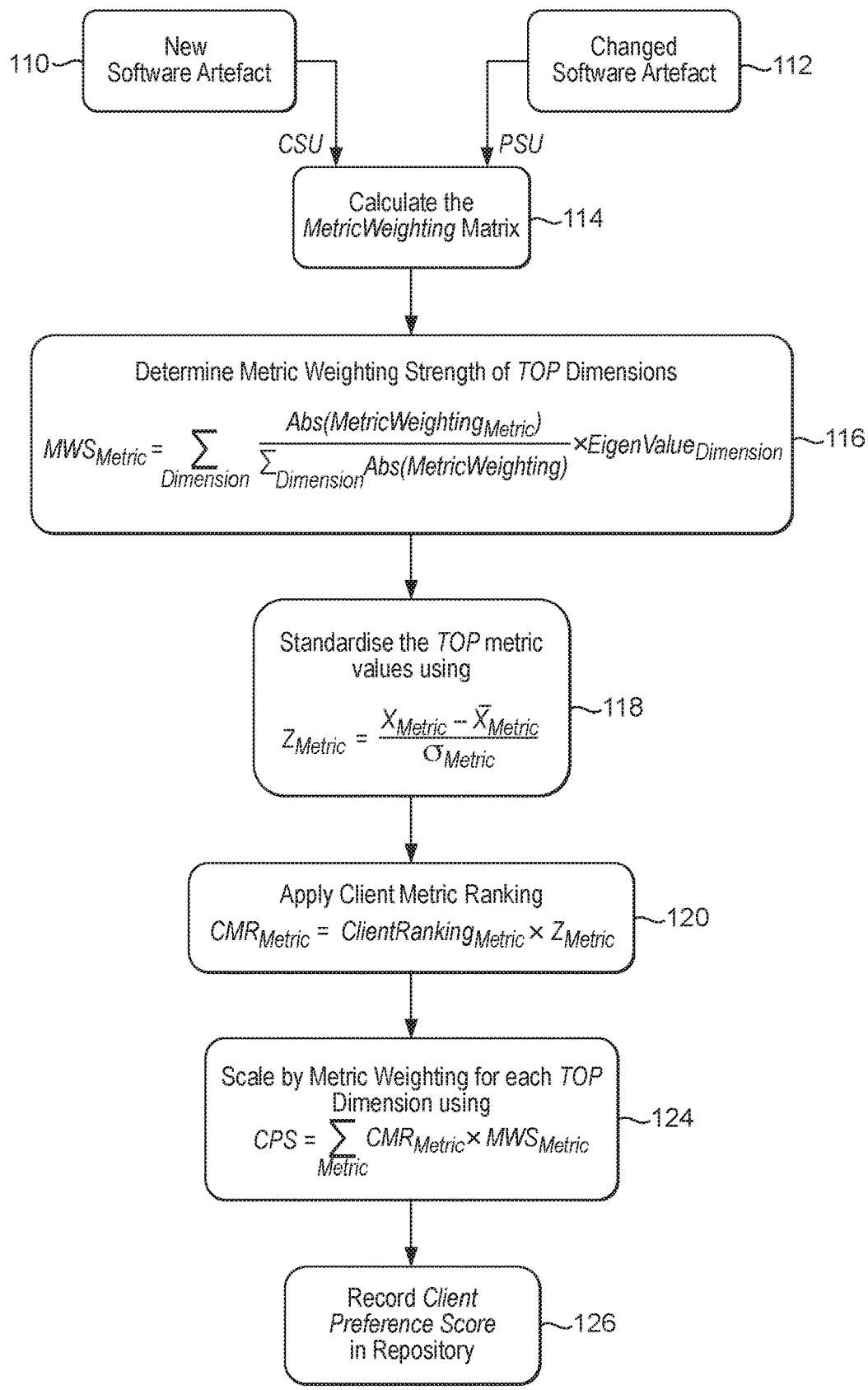
Figure 12:
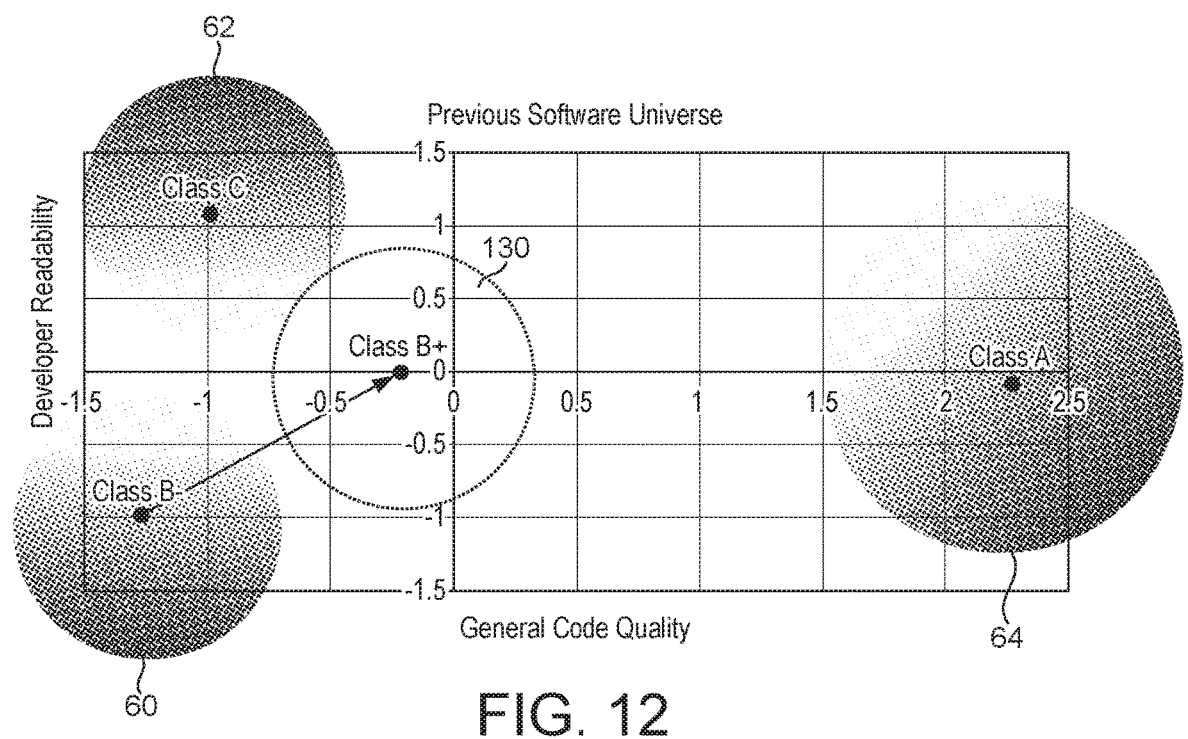
Figure 13:
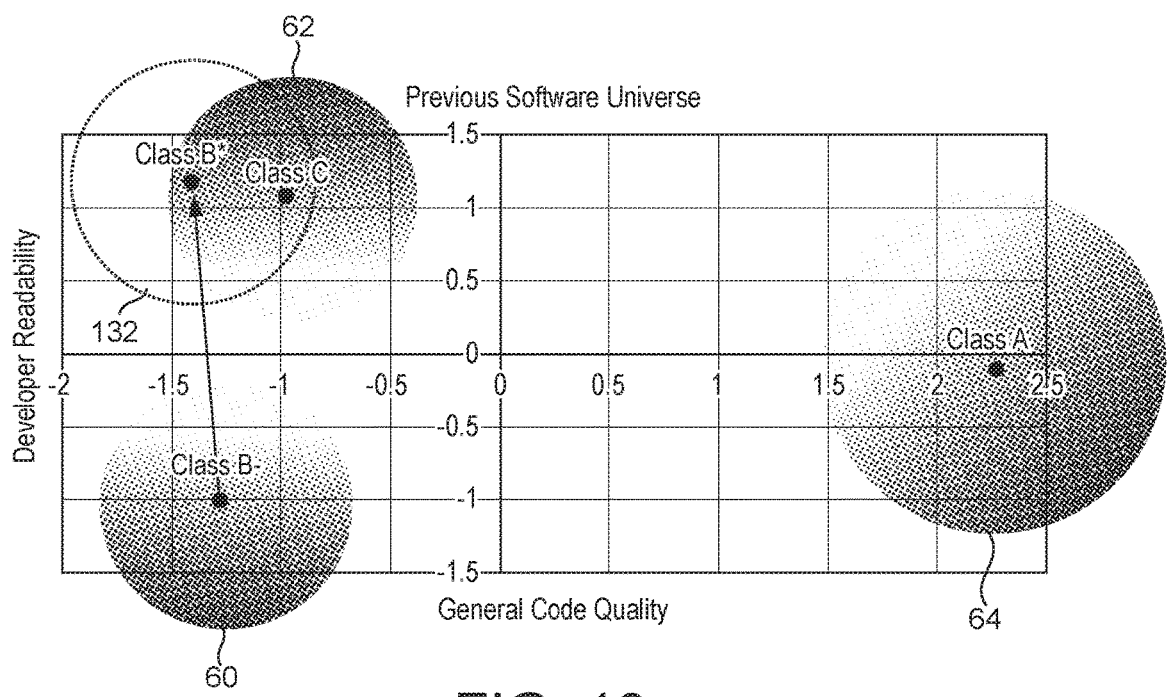
Figure 14:
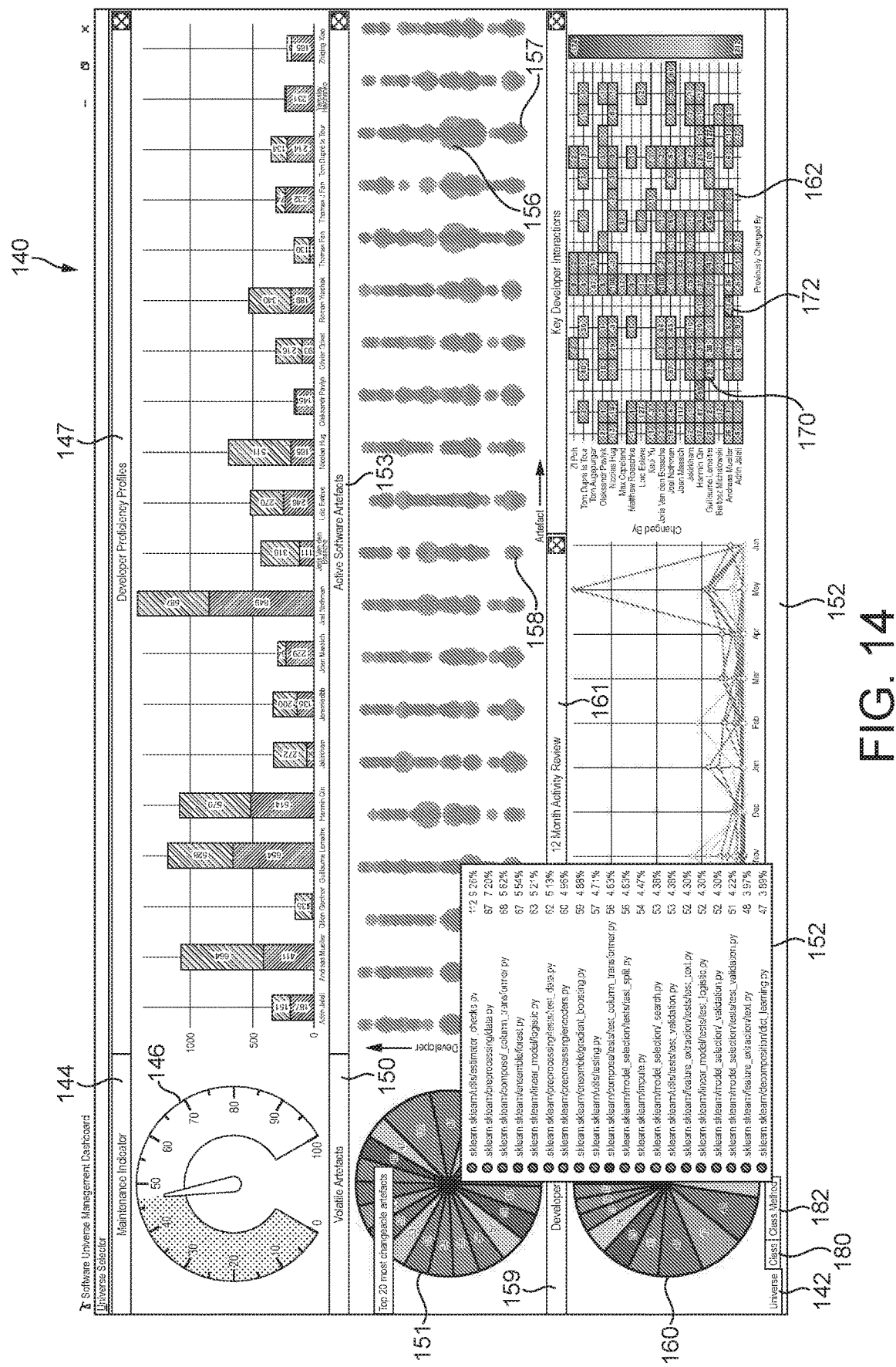
Figure 15:
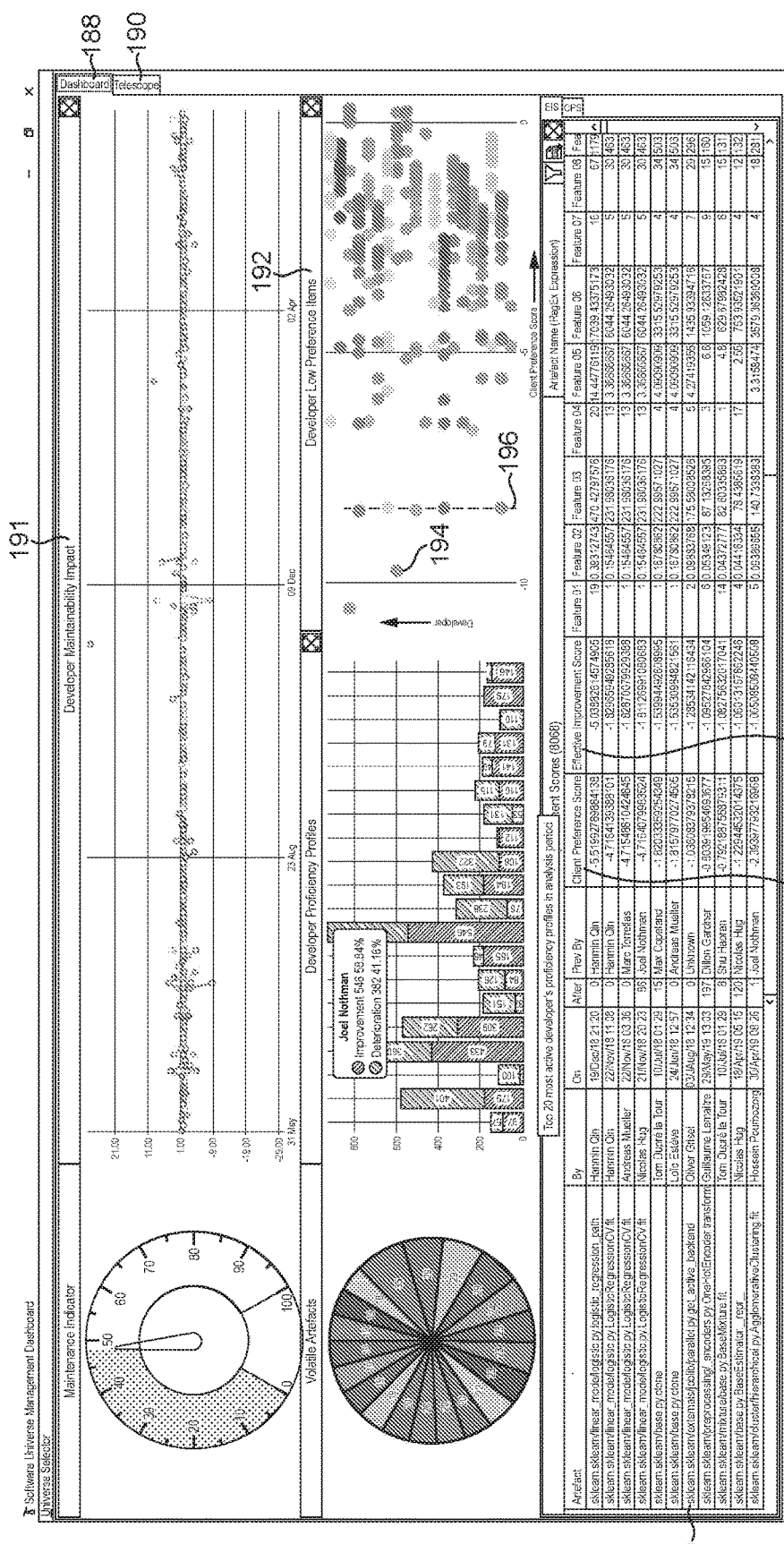
Figure 16:
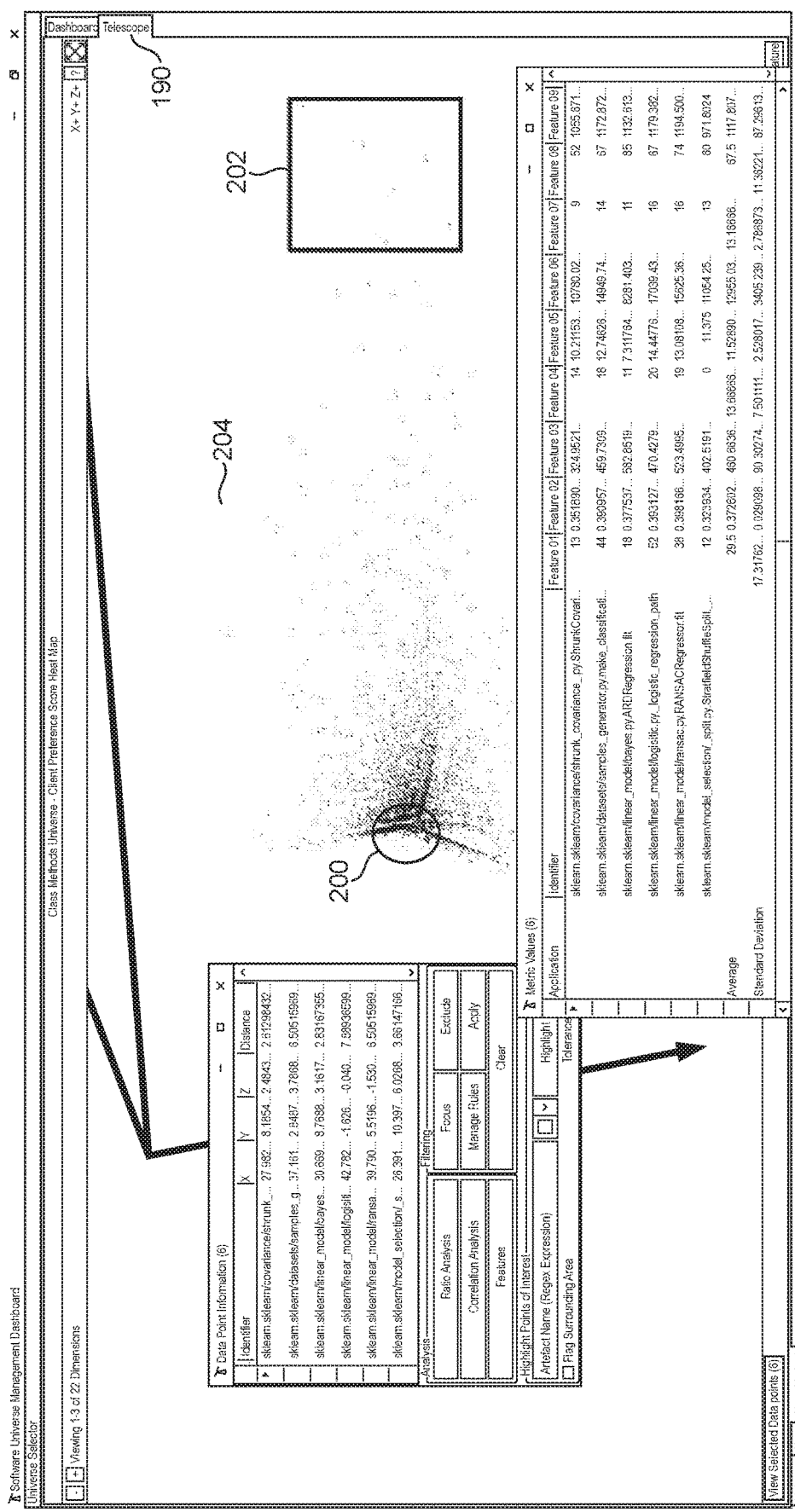
Figure 17:
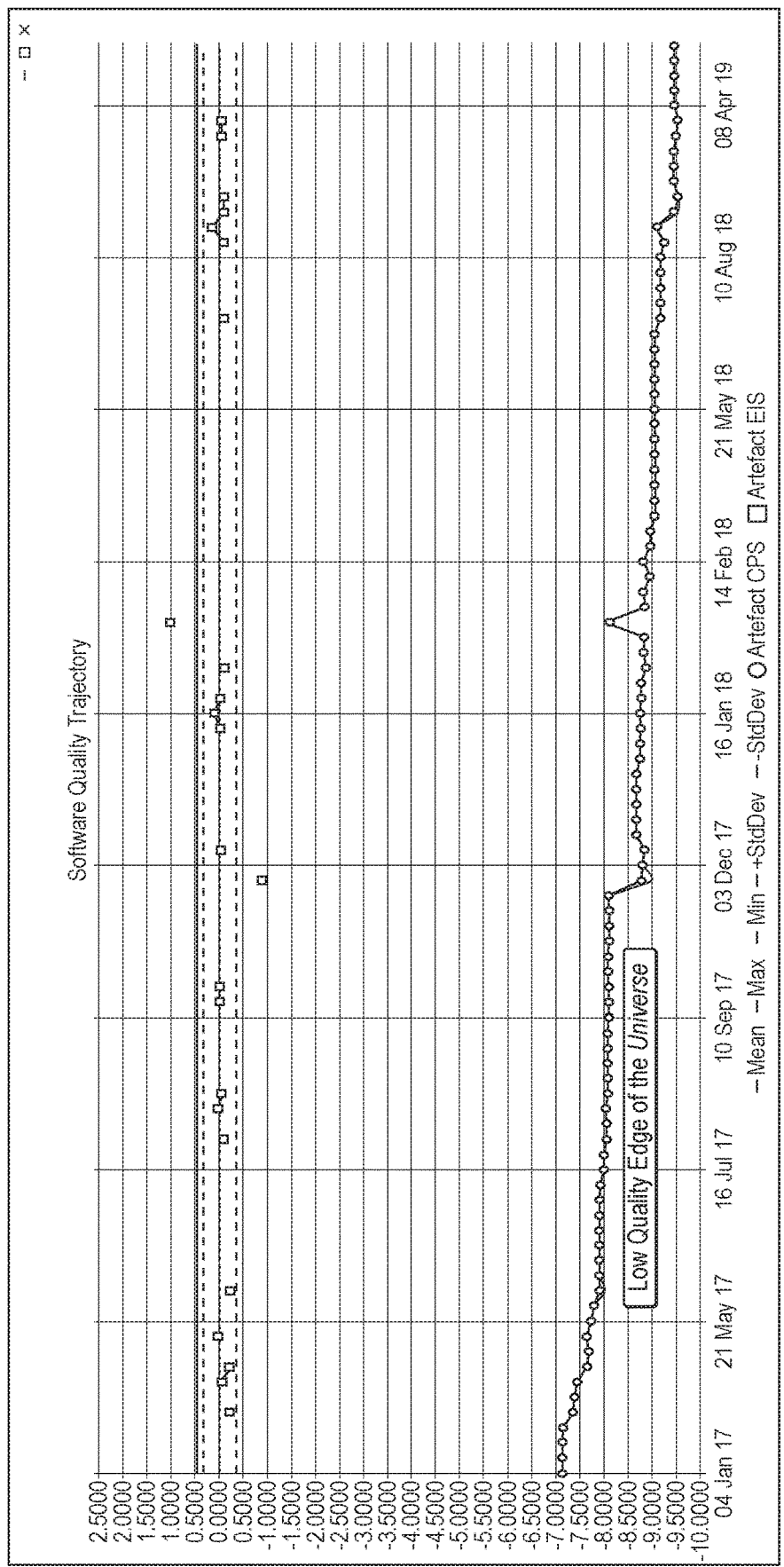

FIGS. 9 (a) to (e) are views depicting how a 3D representation of the software universe changes as axes are rotated;

FIG. 10 is a diagram of a structure of an entropy repository;

FIG. 11 is a block diagram of a process for calculating preference scores;

FIG. 12 is a graph to illustrate the effect of change in code quality;

FIG. 13 is a graph to show a different change in code quality to that shown in FIG. 12;

FIG. 14 is a screenshot of a default screen for an associated software management dashboard;

FIG. 15 is a screenshot of the dashboard for the tab of Class Method;

FIG. 16 is a screenshot of the view of the dashboard when in the Telescope tab; and FIG. 17 is a graph showing future quality of the software.

DESCRIPTION

For software to be maintainable at scale, one needs the individual software program elements within the software to be structurally similar. If the same functionality is implemented in different ways throughout software, with different programmers following different conventions, then problems follow as bodies of software which contain large amounts of variance are difficult to understand and consequently maintain. The present invention allows the software elements, also known as software artefacts, to be viewed in terms of variance, i.e. in relation to their differences from each other, rather than in relation to the details of what the code of each element is actually doing. This allows comparison in relation to other program elements across a variance landscape. By evaluating software in this way, it is easy to show a non-technical individual where problems are arising or where code is being improved. Software metrics are used to build a representation of the whole code base which can be used by technical and non-technical people alike.

Such variance landscapes can be used to create a 'software universe' being a multi-dimensional space that represents the source code variance of software. The software of interest can be thought of as a 'star map'. Conceptually, a star map is an N-dimensional region of the software universe which contains the software we are interested in. Each software artefact is a 'star' in this space. The more diverse the code of one artefact from another artefact, the further apart they are in the universe. The software universe can be navigated to provide augmented intelligence for software development, project management and quality control. This universe shows how similar or dissimilar artefacts within given software solutions are, providing indicators on how comprehensible, extensible and ultimately maintainable the software is likely to be.

Each artefact within software is an item of source code which can be measured using software metrics and can be composed of other software artefacts. These can be categorised as, for example, Solutions, Projects, Entities (Classes or Interfaces) and Behaviours (Methods, Properties and Constructors).

The universe location of a software artefact is derived from meta-metrics (principal components) which are composed of the relevant software metrics for the artefact type in question, weighted by how strongly they represent the variance of the software universe. The universe location has no relevance associated with its absolute positional value, rather information is derived from a software artefact's relative position to other artefacts on the map. It is the distance, or lack thereof, between an artefact and other artefacts in the universe which provides information about the software under analysis.

A software artefact's universe location within a star map is determined by the software metrics available for analysis for the source code in question. The evaluation process does not require predetermined lists of code metrics, rather it can operate on any metrics which can be efficiently supplied. Only those metrics which capture the variance of the software will effectively be utilised by the process.

To quantify how well a software artefact aligns to a chosen development style, a single value 'preference score' can be allocated to allow comparison of different code on the basis their universe location and client specified criteria. In this way, source code is distilled into a single value.

The software universe promotes an approach akin to cosmology to allow exploration of the origin and evolution of code. In this 'codemology' concept, similar software artefacts become grouped together producing "constellations". Those stars that significantly depart from the common practice, represented by the core stars at the centre of the universe, have a high probability of representing difficult to understand and maintain software.

The evaluation process comprises the following stages:
1. Metric extraction for the software under analysis; and
2. Calculating the software universe.

In addition, if required, the process further comprises:
3. Evaluating the software universe via static or dynamic analysis for information discovery and/or understanding the universe topology by interpreting results.

Figure 1:
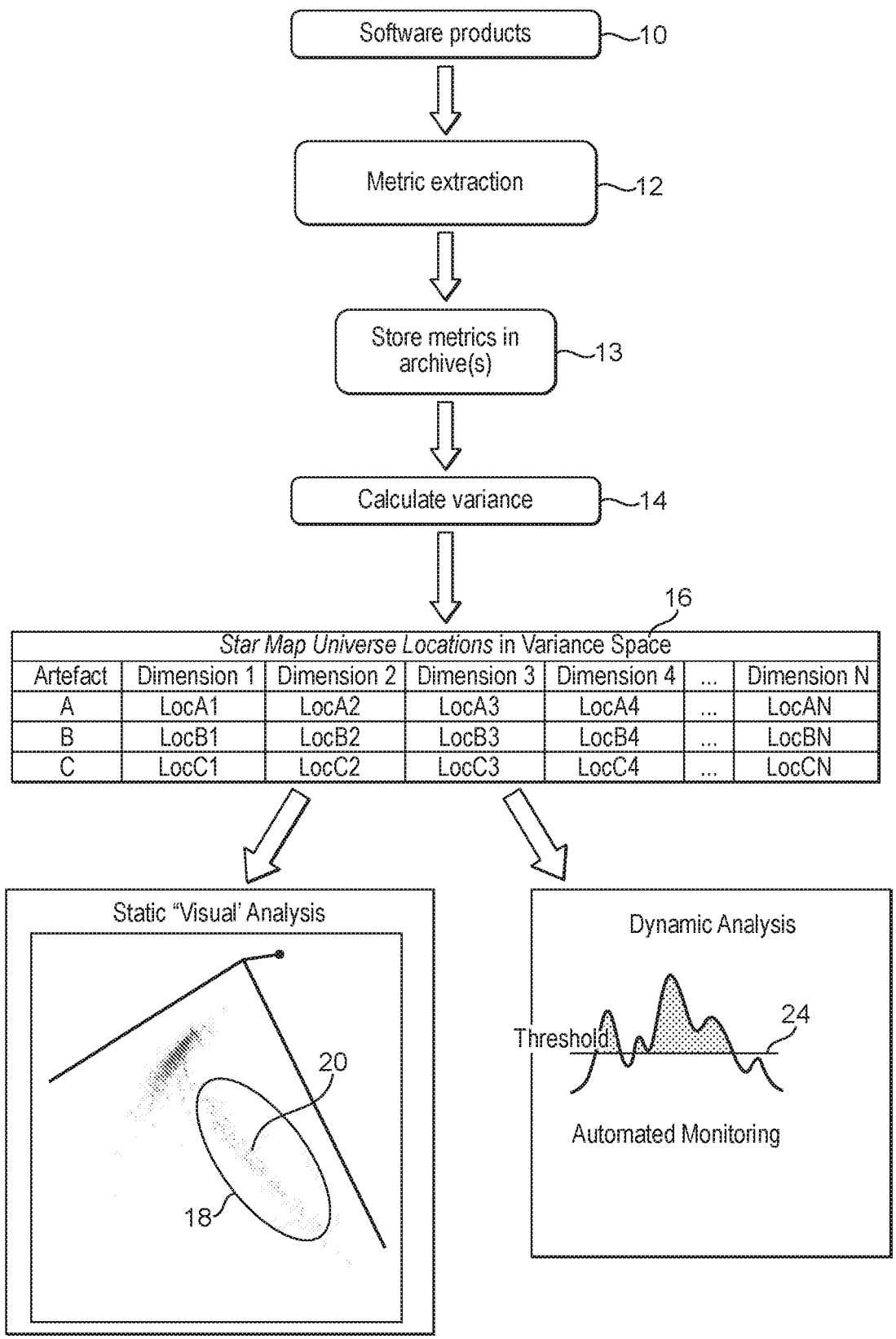
FIG. 1 is a block diagram of a process for evaluating software and creating a software universe.

A basic summary of the process is shown in FIG. 1, where software 10 which comprises a plurality of different software components or artefacts has metrics describing properties of the software artefacts extracted at step 12, if desired stored in archives 13, and converted at step 14 into an N-dimensional representation 16 in variance space. Typically conversion takes place using a principal component analysis algorithm. The most dominant dimensions are used to define three dimensional plots 18 where individual stars 20 relate to each of the different software components and illustrate how different a given software component is from another software component. The metrics associated with each star are retained and can be accessed within the star map so as to allow evaluation of why a particular software component is positioned where it is, allowing understanding of what represents good or bad programming practice. Map 18 represents a form of static analysis. Dynamic analysis can also be undertaken to track changes in the positions of individual stars 20 and so produce an automated monitoring of changes in the code which can be set to monitor a threshold 24 which indicates that programming changes have caused too much variance.

The individual stages used for evaluating the software will now be discussed.

1. Metric Extraction from Software

Initially metrics are extracted from one or more software systems to be analysed and stored in archives 13 which are subsequently used as inputs to calculate the software universe. If desired, metrics from different software systems can be stored in different archives and then analysed together to allow comparison of different software systems. Metrics include, but are not limited to, LinesOfCode, ClassStructuring, ClassCoupling, FieldCount, DepthOfInheritance, ClassCount, CouplingIntensity, MaintainabilityIndex, WhiteSpaceRatio, to name but a few.

The extracted metrics are split into hierarchical categories allowing the software universe to provide analytics over the following aspects of any software system:
Solution
Project
Entity (class/interface)
Behaviour (methods, properties and constructors)

Figure 2:
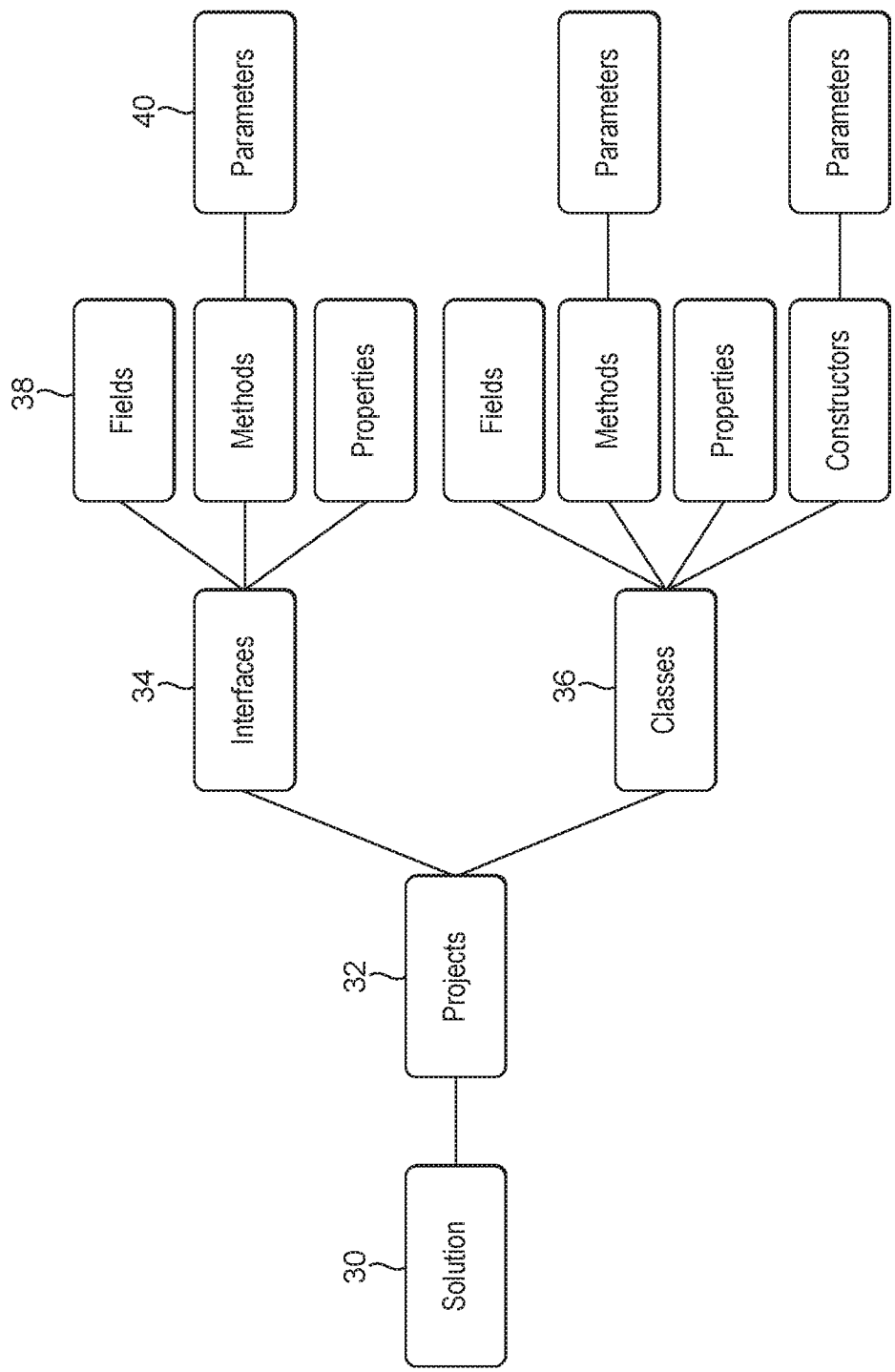
FIG. 2 is a diagram showing how extracted metrics may be separated into different categories.

Categories are organised hierarchically with each category potentially containing one or more child categories as illustrated in FIG. 2, where a Solution 30 is the parent of one or more Projects 32 and in turn a Project 32 will be the parent of one or more Interfaces 34 and Classes 36 and so on. Fields 38 and Parameters 40 are included in the model to calculate various metrics but are not analysed as individual categories.

There are no requirements for any specific metrics. The technique will automatically show the outlying software artefacts of any software analysed within the constraints of the metrics supplied.

2. Calculating the Software Universe

Figure 5:
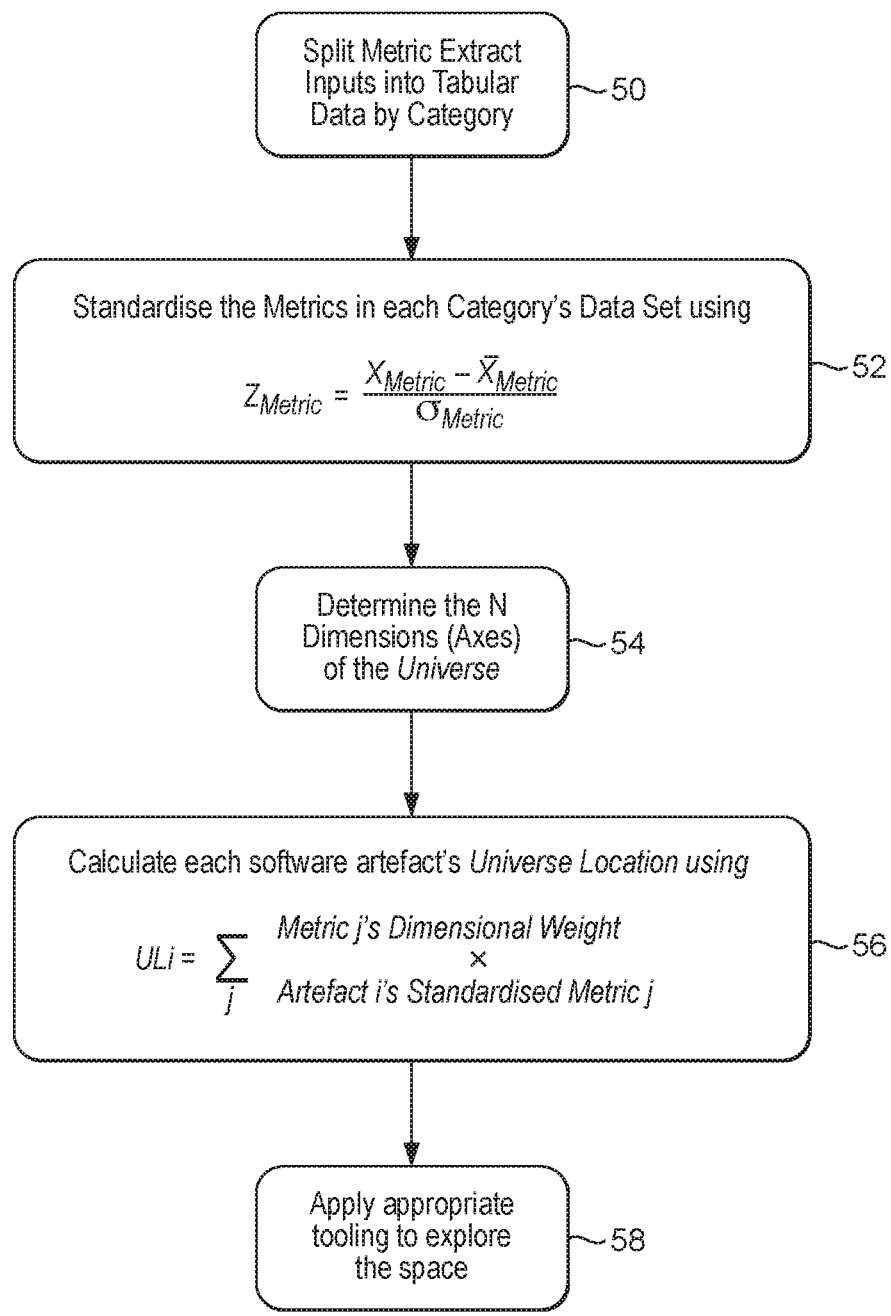
FIG. 5 is a flow diagram that illustrates a process for calculating a software universe.

The steps of calculating the software universe are summarised in FIG. 5. Firstly the extracted metric data is split into tabular data by category such as solutions, projects, entities and behaviours because different categories cannot be compared to each other as they hold different metrics, see step 50. The metrics in each category's data set are then standardised to ensure metric ranges containing large variances do not dominate, see step 52. After this at step 54 the N-dimensions or axes of the universe are determined by using principal component analysis to identify variation within a data set. At step 56, each software artefact's location within the universe is calculated and at step 58 the universe can be explored on a star-by-star basis or using more in-depth static or dynamic analysis.

2.1 Determining Variance Through Principal Component Analysis

After metric extraction has taken place, statistical/machine learning technique Principal Component Analysis (PCA) is used to identify variation within a data set. Any data set provides its own reference system, with each metric representing an axis of the reference system. PCA computes a new reference system with new dimensions for the data, such that the first few dimensions capture most of the variance between software artefacts.

For illustration, a simple example is shown in Table 1 below, where for 14 different software artefacts, called classes, a sample data set for two metrics LinesOfCode and AverageIdentifierLength (Variable Names) is fed into a principle component analysis algorithm to produce transformed data PCA1 and PCA 2.

TABLE 1

| Software artefact | Original data | | PCA transformed data | |
|---|---|---|---|---|
| | Identifier Length | Lines of Code | PCA1 | PCA2 |
| Class 1 | 4.87 | 120 | 234.78686781775025 | −0.49584519026378587 |
| Class 2 | 2.7788 | 926 | −571.21549893820645 | 0.2510826752936437 |
| Class 3 | 5.54 | 247 | 107.78816189726777 | −1.3776583920275702 |
| Class 4 | 4.17 | 20 | 334.7855612556944 | 0.37093661853380178 |
| Class 5 | 4.8762 | 350 | 4.7871980482149477 | −0.8856455811046422 |
| Class 6 | 5.23 | 210 | 144.78759341008811 | −1.0059491937045788 |
| Class 7 | 3.1 | 250 | 104.78409656985518 | 1.0573347308862275 |
| Class 8 | 2.61 | 180 | 174.7831819764161 | 1.6640819970445391 |
| Class 9 | 3.78 | 111 | 243.78503736799024 | 0.60916374414990881 |
| Class 10 | 4.63 | 464 | −109.21305401685497 | −0.829578295434184 |
| Class 11 | 4.421 | 413 | −58.213473524985524 | −0.53551936710519765 |
| Class 12 | 3.11 | 683 | −328.21528452429857 | 0.32516529710795616 |
| Class 13 | 2.96 | 512 | −157.21577252968262 | 0.76036364634643494 |
| Class 14 | 3.68 | 481 | −126.21461480924906 | 0.092067310277454045 |

Figure 3:
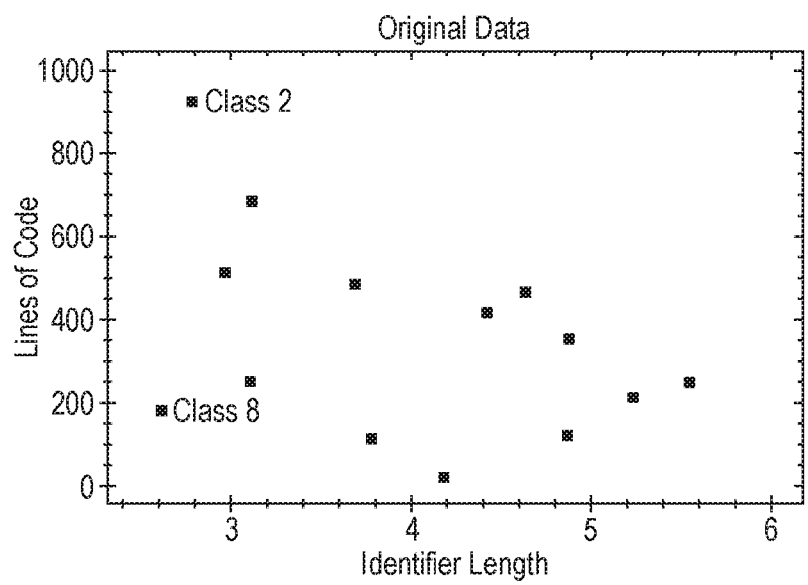
FIG. 3 is a graph illustrating data before processing.
Figure 4:
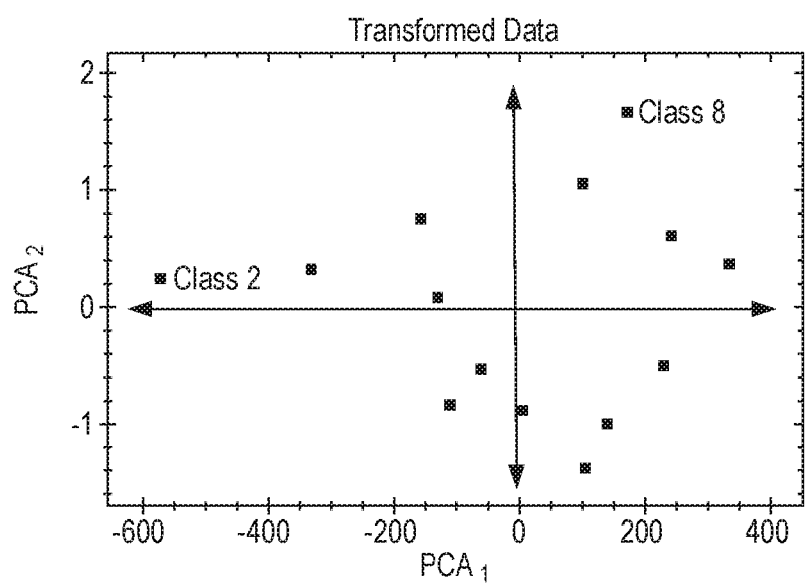
FIG. 4 shows the data of FIG. 3 after processing.

FIG. 3 shows the original data from Table 1 in the original cartesian reference system. However, it is hard to see where the most variation lies. FIG. 4 illustrates the PCA transformed data where the coordinate system is orientated to recognise the variance in the data, the PCA1 axis representing the most variance, PCA2 the next most variance and so on if there is more dimensionality to the data. The original data as shown in Table 1 has been altered by the weight of the 'principal components' which give the axes in the new coordinated system lots of variation. In this example, the principal components are different weighted combinations of the metrics of LinesOfCode and IdentifierLength. Exceptional items become much easier to identify after PCA has been applied. For illustration, two classes (2 & 8) are marked on the graphs. It can be seen that despite the suggested similarity of the IdentifierLength within the original data, these classes are not similar.

Depending on the number of software artefacts and metrics supplied, PCA produces the following number of variance dimensions shown by Equation 1:

Variance Dimensions=Min(#softwareartefacts,#Met-
ricsSupplied)    Equation 1

For industrial software, the number of software artefacts is very large, meaning, the number of metrics available normally determines the number of dimensions within the software universe. However, dimension PCA1 captures the most variance whilst the last dimension captures very little. Therefore, most of the information of interest lies in the first few dimensions of the analysis. Making sense of N-dimensional spaces can be difficult. While this is not a problem for automated systems, it is an issue for human users. So, to aid visualisation the software universe is represented as star maps which are 3D representations along the variance scale.

These are easily navigated mentally, visually and programmatically and can quickly identify artefact outliers indicating problem areas in software.

PCA does not require specific inputs, it simply works with the data it has to find the most variant dimensions. This means there is no restriction to a specific pool of metrics to analyse, rather any or all metrics can be evaluated simultaneously. If metrics are supplied that are not relevant, then they are simply ignored by the PCA algorithm.

The metric inputs will vary depending on what is used to define the software. Therefore, there is no way of knowing beforehand whether the source code being analysed is high or low quality. It cannot be assumed that there is more 'good' code than 'bad' code, or even any 'good' code at all. The origins of each PCA will be centred around the most frequent metric combinations and do not necessarily indicate an ideal. If the majority of supplied code was 'bad' with one or two examples of 'good' code, then the PCA origin (0) would represent poor programming practice. The reference system simply represents what is and does not represent any preference at this stage.

To explain in more detail, an extended example set has been constructed in Table 2 below because metric extracts can be of a considerable size. For Table 2, we are assuming a program consists of three classes, i.e. three artefacts, and there are five metrics available. Generally multiple software programs with many more software artefacts and metrics would be compared.

TABLE 2

| | Original data | | | | |
| --- | --- | --- | --- | --- | --- |
| | Original data | | | | |
| Identifier | LinesOfCode | IdentifierLength | ConstructComplexity | ClassCoupling | Maintainability |
| Class A | 6 | 4 | 1 | 0 | 90 |
| Class B | 120 | 14.67534 | 4.2312 | 6 | 23 |
| Class C | 198 | 5.272727273 | 2.661538462 | 8 | 16 |

The original data is first standardised to ensure each metric provides equal contribution to the analysis. They are rescaled to provide equivalent variance measures. The standardised data is shown in Table 3 below.

TABLE 3

| | Standardised data | | | | |
| --- | --- | --- | --- | --- | --- |
| | Standardised data | | | | |
| Identifier | LinesOfCode | IdentifierLength | ConstructComplexity | ClassCoupling | Maintainability |
| Class A | −1.056328602 | −0.68303919685 | −1.0093421001172 | −1.120897076 | 1.150455142 |
| Class B | 0.124273953 | 1.147803104 | 0.9903884511 | 0.3202563076 | −0.4895553796 |
| Class C | 0.932054649 | −0.46476390734 | 0.01895364899 | 0.8006407690 | −0.6608997625 |

As discussed previously, principal component analysis is then undertaken to rotate the reference system in which the data is represented toward the most variance in the data set. The analysis provides an Eigen Vectors matrix, see Table 4 below, which shows the dimensional weightings for each principal PCA component. In this example component PCA1 holds the most variance, PCA3 the least. For PCA1, we can see that the weights for all metrics are roughly the same in magnitude. The metric MaintainabilityIndex has a positive weighting whilst all the others are negative, suggesting that increasing the former modifies the variance in the opposite direction to the latter and vice versa. For PCA2, the metric IdentifierLength exerts the most influence. Interestingly, the metric weights for each dimension represent a different aspect of the variance, not captured in other dimensions.

TABLE 4

Dimensional weightings
Eigen vectors matrix

| PCA | Lines of Code | Identifier Length | Construct Complexity | Class Coupling | Maintainability | Eigen Value |
|---|---|---|---|---|---|---|
| 1 | −0.44613685 | −0.329741781 | −0.459985885 | −0.48068926 | 0.499582904 | 78.04% |
| 2 | 0.451020016 | −0.724166985 | −0.398515113 | 0.299316605 | −0.154137592 | 21.96% |
| 3 | 0.174078476 | 0.272816956 | −0.467734554 | −0.54309244 | −0.617691327 | 0.00% |

The Eigen Value associated with these vectors indicates how much of the variance each component captures. For this example, 78.04% of the variance is captured by principal component PCA1, 21.96% by PCA2, which means that PCA3 is insignificant for code analysis for this example.

A feature of PCA is that the origin of the new variant reference system represents the average software artefact of the supplied input data. As artefacts move away from the origin, they are the more exceptional items in the data set, i.e. good or bad practice. The axes automatically adjust to separate the components of the software into areas of dissimilarity. Each axis represents a dimension which is a weighted combination of the supplied metrics which emphasise the variance in the data. The more influential metrics effectively determine a dimension, so by considering these, dimensions can be named according to the effect of the dominant metrics on them. Software artefacts will appear in the space spanned by these axes and their proximity to each other indicates similarity, whereas separation shows that artefacts are fundamentally different.

2.2 Calculating a Software Artefact's Universe Location

Universe locations position the software artefact within the N-dimensional software universe. Once the dimensions i.e. individual PCA components are known, universe locations can be calculated by multiplying the dimensional weighting by the standardised data and summing, as given by Equation 2:

$$location_{artefact} = \sum_{pca} Dimensional\ Weighting_{pca} \times Standardised\ Metric\ Data_{artefact} \quad Equation\ 2$$

Table 5 below displays the universe location calculations for three software artefacts in dimensions PCA1, PCA2, and PCA3, which equate to X, Y and Z positions within a three-dimensional space.

TABLE 5

Software artefact universe locations
Software artefact universe locations

| Artefact | PCA 1 (X) | PCA 2 (Y) | PCA 3(Z) |
|---|---|---|---|
| Class A | 2.274327717 | −0.09238432 | 0 |
| Class B | −1.288003806 | −0.99851892 | −9.4369E−16 |
| Class C | −0.986323911 | 1.09090324 | 0 |

Each coordinate (PCA) is essentially a meta-metric, a metric about many metrics. Therefore, an artefact's location within the universe, is determined by a collection of meta-metrics representing its position along various axes.

In the example, the PCA3 (Z) dimension contributes nothing to the variance within the metric profile, so going forward the example data will be analysed in two dimensions, as principal component analysis has dimensionally reduced the data set.

Whilst a universe location's component values can show how dissimilar to the rest of the software under analysis an individual artefact is by its distance from the origin point, the software is better understood when comparing multiple software artefacts, i.e. stars, contextually. A constellation indicates similar artefacts, whilst its position in the software universe defines whether it exhibits 'good' or 'bad' programming practices. The distance between constellations illustrates differing levels of consistency within the software. A lot of information about the relative properties of software artefacts can be obtained by analysing the positions of stars within the software universe.

The PCA components can be viewed as dimensions illustrating general coding characteristics, i.e. similarities and quality of different software components. This allows changes in software during development to be understood.

The coordinate that an artefact has along a PCA axis is the scalar product between the software artefact metrics and the PCA weights. Scalar products are often used to measure alignment between vectors. In other words, the software universe is an evaluation of the alignment between coding conventions and the conventions represented by the artefact.

The metric(s) which exert the most influence within a PCA dimension are used to name the axes. The component weightings of Table 4 provide the data required to describe a star map landscape. As this table is dependent on the individual inputs into the star map, then each star map may have different named axes, representing the pertinent facets of software development for the source code being analysed.

With each star, the individual metric information is also stored so that clicking or hovering on a star allows the original data to be accessed. This is particularly useful when trying to assess the position of a star. Thus by looking at a few stars it is possible to understand whether the star's location represents a software artefact with desirable properties or undesirable properties, and what in particular is causing the positive or negative aspects of the artefact. The universe gives a readily appreciable visual model of the differences of parts of the software and in-depth analysis can be undertaken to obtain more detailed information.

3. Evaluating the Software Universe

The software universe can be evaluated in two ways:
 a) Static analysis—the distance between the locations of the software artefacts;
 b) Dynamic analysis—the change of an artefact's location over time.

Both of these techniques provide quantitative and qualitative information which indicate the overall quality of the software under review. Static analysis lends itself to visualisation, allowing software to be evaluated so as to understand where components are similar or to understand quality relative to other components, with outliers which represent poor programming practice being easily identified.

Dynamic analysis looks at temporal changes of the software which, due to their complexity, are more easily analysed using an automated approach. However, each technique can include automated rules or visualisation systems, so there is overlap between the two.

Dynamic analysis lends itself to automation whereby the monitoring of thresholds can provide alerts to warn stakeholders of the deterioration or improvement of the code under review. By taking advantage of continuous integration practices, entropy repositories can be built by software bots which respond every time a change is made to the code base. These bots calculate the software universe and record it within the repository at that point in time. The entropy repository is then mined for information, as required. By monitoring the positional change of stars within the universe, the effect on the quality of a software artefact can be determined, along with who is responsible for this alteration.

3.1 Static Analysis

Static analysis shows the metric landscape of software at a point in time and makes it possible to discern preferred software artefacts from unwanted ones. This technique provides the opportunity to compare software written by different teams or individuals, granting the ability to answer questions such as:

What are the least consistent attributes of the code (as captured by the metrics) within a software application?
What software artefacts are of the highest/least quality?
Will this software be easier to maintain than that software?
We have written software x, how likely is it that we will be able to understand software y?
Does developer x have a similar development style to developer y?
Would developer x fit within the development team that produced software y?

Figure 6:
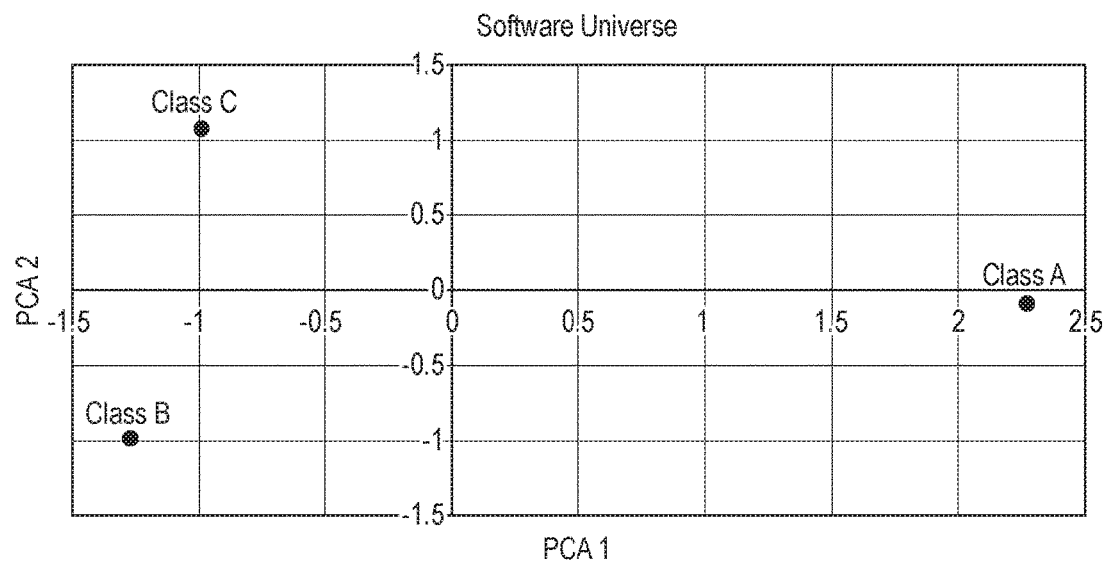
FIG. 6 is a graph showing data from Table 5.

The example data from Table 5 excluding PCA3 is visualised in FIG. 6. In our example, using Table 4, PCA1 is weighted toward maintainability, complexity, coupling and code size, whilst PCA2 favours identifier length and code size. Thus PCA1 could be termed General Code Quality, whilst PCA2 represents Developer Readability. Thus one can understand what the reference system defined by the variance weighted PCA1 and PCA2 represents.

Each star representing an individual software artefact retains information about the original metric values underpinning the software artefact universe locations. By interpreting the metrics of a few select artefacts, different areas of the space can be classified as favourable or not. The advantage here is that very large star maps require the analysis of a few software artefacts to provide topology context, i.e. you can classify 'good' or 'bad' locations within the space without having to process every data point. Table 2 details the metrics which define the three classes. In this instance:

Class A: is a very small software artefact, which is stand alone, easy to maintain and looks to be easy to understand.
Class B: is a more complicated piece of software, which is connected to a number of other classes, looks to be difficult to understand and maintain but has meaningful identifier names.
Class C: is quite like Class B; again, difficult to understand, connected to quite a few classes and harder to maintain. The identifier names do not seem as descriptive but the complexity of code construction is more streamlined than Class B.

Essentially Class A has 'good' characteristics and Classes B and C are more troublesome but in slightly different ways. Classes A, B and C sit at extremes of the Developer Readability axis with Class B having high ConstructComplexity and Class C having poor Identifier clarity. Their position however is not determined by one value, but by a combination of component weightings.

Figure 7:
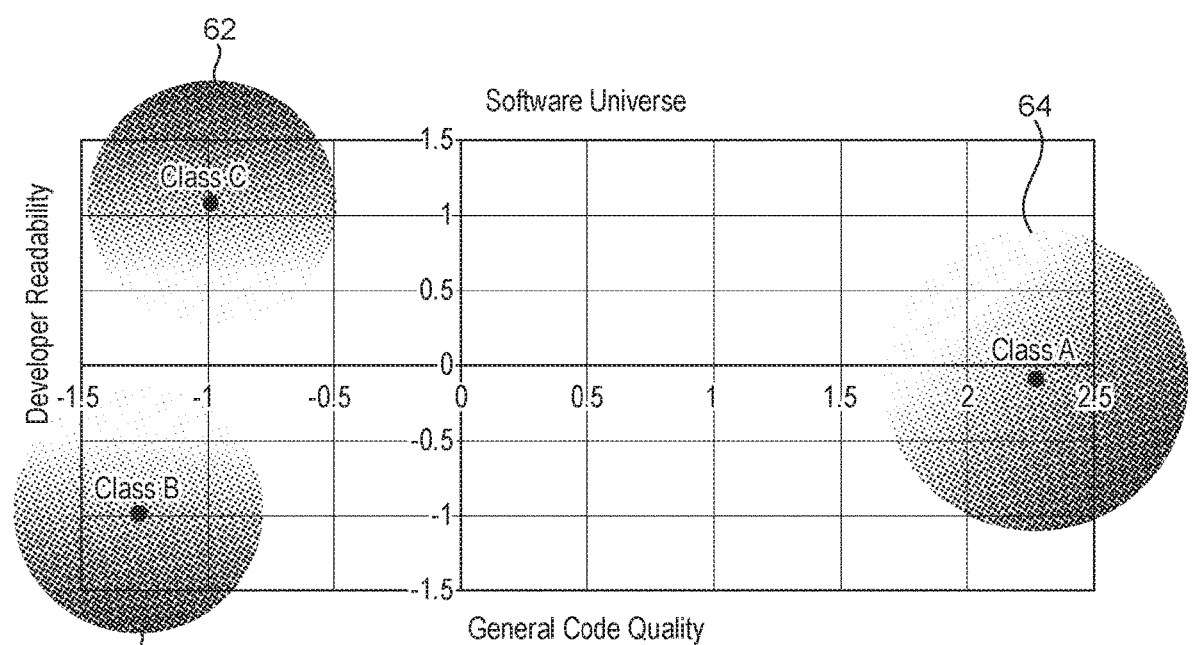
FIG. 7 is a graph illustrating preferred areas for the graph shown in FIG. 6.

With this information we can regionalise the star map to identify preferred areas, as illustrated in FIG. 7.

For this example Classes B and C have readability issues and are located in the red areas 60, 62 of the map where code quality is negative. Ideally, these classes should be improved and once a developer has modified these classes then the map is re-computed. If the code is improving, then it will be moving toward the green region 64 of the map where Class A is located and away from the red areas. Software development through visualisation is a useful technique for training newer development staff.

Once the characteristics of a region are defined, artefacts positioned in and around that area exhibit similar characteristics, allowing one to establish the quality of the software under analysis.

Navigating multi-dimensional spaces is more difficult than the above 2D example, but the concepts above remain valid and very complicated large software systems can be analysed very quickly with this approach.

If we take the first two principal components PCA1 and PCA2, software artefacts can be viewed as a 2D scatter plot graph, for three we can use a 3D graphing tool. Manipulating the data visually becomes conceptually very difficult if we exceed 3D models.

Figure 8:
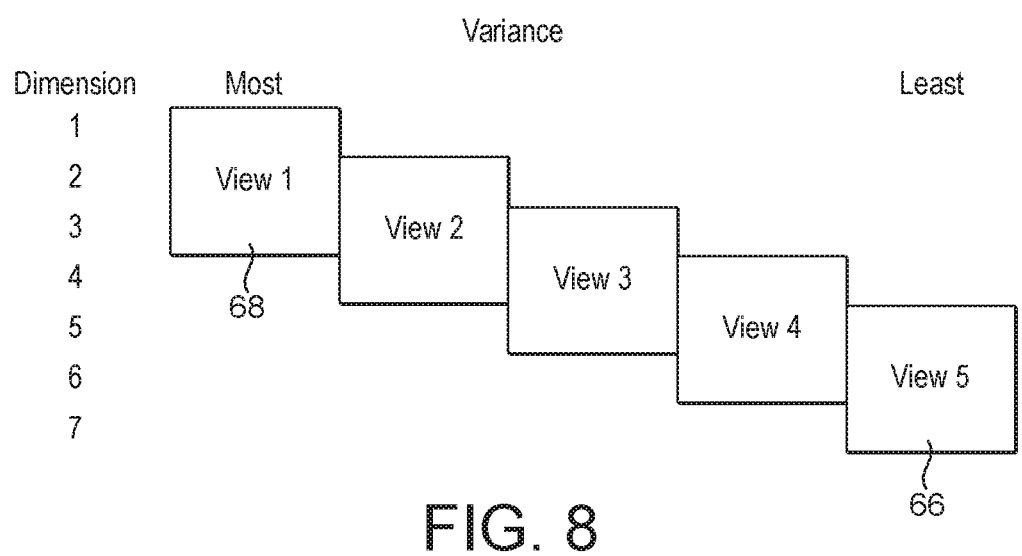
FIG. 8 is an illustration of the variance for three-dimensional slices of a seven dimensional universe.

However, we can navigate the N-dimensional software universe space by slicing it into 3D views using star maps, ranging from most variant to least variant and analysing those views for useful information. A star map with N-dimensions, would have N−2 slices that could be displayed, one where PCA1, PCA2 and PCA3 are the axes of the reference system, one where PCA2, PCA3 and PCA4 are the axes, and so on, the last view being defined as PCA N−2, PCA N−1, and PCA N. This is illustrated in FIG. 8.

As the most variance is very often contained in the first three dimensions, shown at 68, it is often unnecessary to drill further into the data. View 1 derived from the principal component analysis is the default setting and ordinarily captures >65% of the variance within the software. The given example captures all of the variance in the first two dimensions.

Outliers within a star map are key candidates for review. These artefacts either exemplify robust well-developed code or more frequently poorly developed and/or difficult to maintain software components which stand apart from an average code base.

FIG. 9 shows commercial Lloyd's of London Underwriting System software when evaluated using the present method. FIGS. 9 (a) through to 9 (e) show the three-dimensional representation of the software universe derived for the Underwriting System software. The variance of the different software artefacts summed over all their metrics is illustrated in three dimensions in relation to axes 70, 72, 74 and the plot can be rotated so as to give clearer views of where the variance lies. In FIG. 9 (a), the professionally developed code in green and yellow 76 seems relatively close to some non-professional code 78 not belonging to the Underwriting System and shown in blue. However, as the view is rotated through views b) to e), it can be seen that the non-professional software is substantially different to the professional software as can be seen from the distance of the blue points from the green and yellow points. By rotating the map outliers can be clearly seen, efficiently identifying software artefacts for review as shown in FIG. 9 (*e*) where the blue stars representing the 'bad' code are clearly separate from the professionally developed software in green and yellow.

The map provides a navigable space where each star can be drilled into by a human user to look at the original metric information and so decide what is making it similar or dissimilar to other stars. Ideally, all stars should be located fairly close to each other and the evaluation tool described herein allows the difference to be clearly identified, analysed to identify the metric or metric combinations causing the difference and then corrected by the developers so as to reposition the software artefact closer to the region of software artefacts displaying desirable properties.

As software elements are altered, changes in the universe can be monitored to see whether the software elements are moving closer or further away from a preferred area represented by a constellation.

3.2 Dynamic Analysis

Dynamic analysis focuses on how software artefacts are changing over time to determine whether their quality, based on metric factors important to the organisation using the technique, are being increased, decreased or maintained.

Dynamic analysis can provide information which can advise how the software project should be managed going forward, providing an early warning system of incremental detrimental change being applied over time. It can identify changes that are often missed when the software behaves functionally and the team is simply focused on hitting the next deadline, but that are often detrimental to the long-term maintainability of the software.

For dynamic analysis, an entropy repository can be used to hold data that enables the movement of software artefacts to be monitored over time. Each movement can be quantified as an improvement or deterioration. This makes it possible to identify, prioritise and, then, correct deteriorations to the software thereby addressing the problem of the disorganisation that grows without proactive management. An improvement will exhibit preferred client specified metric profiles, whilst a deterioration will represent a deviation. The entropy repository allows active working towards a common set of quality metrics through which the code will naturally exhibit a cleaner design.

Entropy repositories can be imagined as recording how a star map has moved over time: imagine a video of the night sky or a trajectory map. Stars moving toward 'good' areas of the map indicate improving quality, whilst movement toward 'bad' areas provide an early warning system for increased complexity and disorganisation. The volume of movement indicates the amount of change being applied across a project. The changes in universe locations of the stars show whether the changes are beneficial or detrimental to the project.

Entropy repositories are derived from metric extracts and hold the universe locations and underlying base metrics along a timeline which tracks when a change occurred to a software artefact and who made it. The repositories do not have to record every data value, at every point in time, only those that change and when the change was made. Thus they are not unnecessarily large data stores but may be a significant size dependent on the software being analysed, combined with its development history.

An entropy repository can be defined as illustrated in the relationship diagram of FIG. 10. For each developer 80, a snapshot 82 is taken as a software artefact 84 is changed and software metrics extracted at 86 which are then used to create a software universe 88 as described previously. A timeline 90 is maintained so as to monitor the changes over time with universe dimensions 92, universe locations 94, weighting 96, metric name 98 and metric value 100 recorded. Client preferences as to preferred metrics can be used within the structure, see 102 and artefact names allocated, see 104.

To provide an indication of the ongoing maintainability of software, taking into account the changes applied and client preferences, client preference scores (CPS) and effective improvement scores (EIS) can be calculated based on the values stored in the entropy repositories.

A client preference score is a scalar value for a software artefact that represents how well the client believes that that entity represents good programming practice. It is a weighted aggregation of all component metrics and their variance strengths within each dimension of the software universe. An effective improvement score represents the change that has occurred to a software artefact, whether it is a 'good' or 'bad' change is based on a set of client-specified criteria.

To populate entropy repositories the process, the process is cyclical and continuously iterates the following steps:
1. Monitor the version control system (VCS) for changes
   An automated process is implemented which watches the version control system for changes to the source code. This may be for all aspects of the code or just specific branches.
2. Fetch the changed software version
   Once a change occurs, a copy of the software (up to that change) is pulled from the VCS into a local scratch area.
3. Extract metrics
   A metric extract is then produced from the copy of the software.
4. Update the repository
   The metric extract is then imported into the entropy repository structure defined in FIG. 10. The import includes the base data from the extract as well as the calculated software universe.
5. Calculate and inform
   The repository is then mined to produce relevant information on the software project. A client preference table records every positive or negative change associated with a software artefact, along with the individual responsible for the change. This information can provide early warning mechanisms to monitor the health of a project or the performance of the development team.

The individuals responsible for developing the software can specify positive/negative/zero weights for different software quality metrics which they feel are appropriate for developing robust and maintainable software. This client metric ranking produces weights which indicate which parts of, or directions within the software universe are 'good'. This ranking technique is useful when the software is undergoing rapid change and the universe is evolving. i.e., the dimensions (PCA components) vary over time as the metric variance is being affected by ongoing software updates. Examples of when this can occur are when a failing project has been picked up by a new team and extensive remedial action is under way or a new project has been commissioned and development is in the early stages. There is no need to monitor whether the software universe itself is changing, this is beneficial when the focus is purely on code development.

Providing the dimensions change infrequently i.e., the programming behaviours captured by the universe remain consistent, then the PCAs can be weighted directly with specific development practices being prioritised, for example Developer Readability and Code Quality Weightings are applied directly to software universe dimensions (PCA components) to specify desired behaviours when calculating Preference Scores. This is a more intuitive approach but users of the technique must be cognizant that the universe dimensions need to be stable and understand the meaning of such dimensions.

For illustration, implementation of client metric ranking showing how a scoring method is applied within a software universe entropy repository will now be discussed.

For client metric ranking, the client preference score (CPS) of new software artefacts within a snapshot should be calculated using the current software universe (CSU), whilst changed software artefacts should use the previous software universe (PSU). The PSU is used because when the software was changed the variance dimensions (PCAs) describing it changed too.

Therefore, comparing universe locations from two separate snapshots would be incorrect. To determine a valid positional change, the movement of the modified artefact is calculated using the weightings of the originating universe (PSU).

The CPS is calculated via the process shown in FIG. 11. For a new software artefact 110 and a changed software artefact 112, the correct software universe topology to be used is determined. The metric weighting matrix 114 is calculated using principal component analysis, see step 114, and at step 116 the metric weighting strength for the appropriate universe topology is calculated at 116 and then standardised at step 118. Client metric ranking is then applied at step 120, and then at step 124 scaling by metric weighting takes place for each dimension. This produces a client preference score which can be recorded in the entropy repository, see step 126. Every time an artefact is changed, details of that change and a new CPS will be recorded, step 126.

An Effective Improvement Score (EIS) shows whether an update to an artefact was beneficial according to the client. Positive scores indicate an improvement in quality, negative a decline. An EIS is defined by Equation 3 as:

$$EIS = CPS_{snapshot} - CPS_{previous\ snapshot} \quad \text{Equation 3}$$

To summarise, there are two types of preference scoring: CPS ranks the universe location in terms of how preferable that position is within the software universe according to client preferred quality attributes. CPS is one way to classify the 'good'/'bad' areas within a software universe, whilst considering human inclination (through some form of weighting). Software artefacts always have a CPS. EIS show whether an update to a software artefact has improved software quality or not, according to the preferences that define the CPS. A software artefact only has an EIS if it has been modified from when it originally appeared in the software universe.

The multi-dimensional software universe allows all software changes to be distilled into corresponding preference scores. As they are comparable, effects on the software development process can be evaluated and hence managed more effectively.

The entropy repository structure shown in FIG. 10 allows comparisons to be made between any combination of software artefacts, developers, client defined quality measures and time through the underlying metrics. These items, when combined, provide information that enables reasoning to be applied to large scale software development in an efficient manner. By tracking when the change occurred, who made it and whether it was 'good' or 'bad', indicators of ongoing project quality can be evaluated.

To explain in more detail about how to determine the effect of a change on software quality, let us assume an update occurred in the software exemplified in Table 2, which changed the base metrics of the software artefact Class B to those shown in Table 6 below, where B− and B+ represent the class before and after the update, respectively.

TABLE 6

| | Changed data | | | | |
| --- | --- | --- | --- | --- | --- |
| | Changed data | | | | |
| Identifier | Lines of Code | Identifier Length | Construct Complexity | Class Coupling | Maintainability |
| Class B− | 120 | 14.67534 | 4.2312 | 6 | 23 |
| Class B+ | 240 | 10.11 | 2.989 | 2 | 68 |

It can be seen that the size of the class given by the metric LinesOfCode has doubled but the metrics defining how complex the code is have improved (ConstructComplexity and ClassCoupling have decreased) whilst the metric Maintainability has increased. The metric IdentifierLength has decreased but is still a meaningful length, so is likely to have a negligible effect on readability. Dependent on how the owner of the software feels about aspects of software development captured by the metrics, preference scoring can be calculated, i.e. for this change we can say whether the code has improved or deteriorated from the client's viewpoint.

The first step is to use the entropy repository to generate the previous software universe (PSU), see Table 4, which is used to generate the metric weighting matrix. The PSU is required as this is an update to an existing software artefact. Principal component analysis is used to create the Eigen Vectors matrix shown in Table 7 below.

TABLE 7

Eigen Vectors matrix
Eigen Vectors matrix

| PCA | Lines of Code | Identifier Length | Construct Complexity | Class Coupling | Maintainability | Eigen Value |
|---|---|---|---|---|---|---|
| 1 | −0.44613685 | −0.32974178 | −0.45998589 | −0.48068926 | 0.4995829 | 78.04% |
| 2 | 0.451020016 | −0.72416699 | −0.39851511 | 0.299316605 | −0.15413759 | 21.96% |

The metric weighting strengths, see FIG. 11 step 116, are then derived, see Table 8. These ensure each metric change is related to the strength of its impact within the dimension.

TABLE 8

Metric weighting strengths
Metric weighting strength

| PCA | Lines of Code | Identifier Length | Construct Complexity | Class Coupling | Maintainability |
|---|---|---|---|---|---|
| 1 | 0.157104569 | 0.116116704 | 0.161981428 | 0.169272005 | 0.17592529 |
| 2 | 0.048858588 | 0.078448351 | 0.04317078 | 0.032424696 | 0.01669759 |

Class B+ is then placed within the previous software universe (PSU) despite moving in the current software universe (CSU). We do this because we are looking to see Class B+ in terms of the influence on its originating position.

The PSU is used to determine the mean and standard deviation, see Table 9 below, to standardise the updated position of Class B, Table 10. Tables 11 and 12 show the standardised metric values of all classes in the example.

TABLE 9

Previous universe data
Previous universe data

| Identifier | Lines of Code | Identifier Length | Construct Complexity | Class Coupling | Maintainability |
|---|---|---|---|---|---|
| Class A | 6 | 4 | 1 | 0 | 90 |
| Class B− | 120 | 14.67534 | 4.2312 | 6 | 23 |
| Class C | 198 | 5.272727273 | 2.661538462 | 8 | 16 |
| Mean | 108 | 7.9826891 | 2.6309128 | 4.6666667 | 43 |
| SD | 96.560862 | 5.8308353 | 1.6158177 | 4.163332 | 40.853396 |

TABLE 10

Updated data
Updated data

| Identifier | Lines of Code | Identifier Length | Construct Complexity | Class Coupling | Maintainability |
|---|---|---|---|---|---|
| Class B+ | 240 | 10.11 | 2.989 | 2 | 68 |

TABLE 11

Previous universe data standardised
Previous universe data standardised

| Identifier | Lines of Code | Identifier Length | Construct Complexity | Class Coupling | Maintainability |
|---|---|---|---|---|---|
| Class A | −1.0563286 | −0.6830392 | −1.0093421 | −1.12089708 | 1.15045514 |
| Class B− | 0.124273953 | 1.147803104 | 0.990388451 | 0.320256308 | −0.48955538 |
| Class C | 0.932054649 | −0.46476391 | 0.018953649 | 0.800640769 | −0.66089976 |

TABLE 12

| | | Updated data standardised | | | |
|---|---|---|---|---|---|
| | | Updated data standardised | | | |
| Identifier | Lines of Code | Identifier Length | Construct Complexity | Class Coupling | Maintainability |
| Class B+ | 1.367013485 | 0.364838103 | 0.221613603 | −0.64051262 | 0.61194422 |

Tables 11 and 12 along with Table 7 can then be used to calculate the universe locations to see how Class B+ has moved within the previous software universe. These are shown in Table 13.

TABLE 13

| | Universe locations | |
|---|---|---|
| | Universe locations | |
| Identifier | PCA 1 (X) | PCA 2 (Y) |
| Class A | 2.274328 | −0.09238 |
| Class B− | −1.288 | −0.99852 |
| Class B+ | −0.2185122 | −0.022009 |
| Class C | −0.98632 | 1.090903 |

FIG. 12 shows the changes have produced an overall positive effect. The modified class B+ 130 has moved toward a previously classified 'good' area of the software universe. From the chart, the general code quality has improved slightly whilst the developer readability is no longer at an extreme.

To calculate the client preference score, the client's preferences on which software metrics are important are applied to the standardised metrics. For illustration, the preferences in Table 14 below are used.

TABLE 14

| | Client metric rankings | | | | |
|---|---|---|---|---|---|
| | Client metric rankings | | | | |
| | LinesOfCode | IdentifierLength | ConstructComplexity | ClassCoupling | Maintainability |
| Preference | Bad | Don't Care | Good | Good | Good |
| Multiplier | −1.5 | 0 | −0.5 | −2 | 1.5 |

The multiplier defines the strength of the preference and caters for the metric direction. High complexity and coupling are perceived as damaging so lowering them is a positive effect the client is after, in this instance they perceive the metric ClassCoupling as more important than ConstructComplexity. Low Maintainability is an unwanted attribute of software, so increasing the metric Maintainability is another important aim. The client does not want large volumes of functionality in each class and puts a premium on smaller class sizes. IdentifierLength is one of those metrics which is dependent on the context they are viewed in, for very small blocks of code, small identifiers are adequate, as code size increases more meaningful identifier names become beneficial. However, for this scenario, the client is unconcerned about this metric.

In practice only Class B+ would need to be calculated as the other CPS would be recorded in the entropy repository at this stage, however for clarity in our example all software artefacts will have their CPS calculated, which will allow comparison and review.

Each base metric is multiplied by the client's preference to determine a preference ranking, FIG. 11 step 120, yielding the results in Table 15.

TABLE 15

| | Client metric rankings | | | | |
|---|---|---|---|---|---|
| | Client metric rankings | | | | |
| Identifier | Lines of Code | Identifier Length | Construct Complexity | Class Coupling | Maintainability |
| Class A | 1.584492903 | 0 | 0.50467105 | 2.241794153 | 1.72568271 |
| Class B− | −0.18641093 | 0 | −0.49519423 | −0.64051262 | −0.73433307 |

TABLE 15-continued

Client metric rankings
Client metric rankings

| Identifier | Lines of Code | Identifier Length | Construct Complexity | Class Coupling | Maintainability |
|---|---|---|---|---|---|
| Class B+ | −2.05052023 | 0 | −0.1108068 | 1.28102523 | 0.91791634 |
| Class C | −1.39808197 | 0 | −0.00947682 | −1.60128154 | −0.99134964 |

Each metric rank is then scaled by weighting strength form Table 8 for that metric and each variance dimension, see FIG. 11 step 124. The summation of these scores provides the client preference score (CPS) shown in Table 16.

TABLE 16

Client preference score
Client preference score

| Identifier | Lines of Code | Identifier Length | Construct Complexity | Class Coupling | Maintainability | CPS |
|---|---|---|---|---|---|---|
| Class A | 0.326347161 | 0 | 0.10353438 | 0.452162484 | 0.33240597 | 1.214449999 |
| Class B− | −0.03839378 | 0 | −0.10159019 | −0.12918928 | −0.14144935 | −0.4106226 |
| Class B+ | −0.42233162 | 0 | −0.02273226 | 0.258378562 | 0.17681169 | −0.00987363 |
| Class C | −0.28795338 | 0 | −0.00194419 | −0.3229732 | −0.19095662 | −0.80382739 |

The calculations are now complete and we have a measure of how the client views each software artefact. As with stars within the software universe, a single entity informs us of very little, however the scores are comparable and we can obtain meaning when we view the data ranked. This is illustrated in Table 17 where the score improvement based on client preferences from Class B+ over Class B− is evident.

TABLE 17

Client preference scores
Ranked client preference scores

| Identifier | CPS |
|---|---|
| Class C | −0.80382739 |
| Class B− | −0.4106226 |
| Class B+ | −0.00987363 |
| Class A | 1.214449999 |

The preferred software artefacts within this data are Class A and Class B+, which is borne out by FIG. 12. The client rankings however penalise the less variant Class C over Class B because the client weightings are prejudiced against the size of the class and how coupled it is to other classes. In this example Class C underperforms Class B− in both areas.

This example shows that while the variance within the software universe is important for separating software artefacts, preferences can be injected into the model to prioritise criteria deemed important by those using the technique.

If software artefact Class B− is changed as before but the Lines of Code metric increases to 500 we gain a new Class B*. The class metric rankings shown in Table 14 demonstrate a preference for fewer lines of code.

Replicating the calculation process of FIG. 11 delivers the movement within the previous software universe shown in FIG. 13 where the adjusted change shown by region 132 is clearly being worse than the change undertaken in FIG. 12. The general code quality has deteriorated for Class B*.

Completing the calculation process produces the CPS scores shown in Table 18.

TABLE 18

Client preference scores
Ranked client preference scores

| Identifier | Score |
|---|---|
| Class B* | −0.84173894 |
| Class C | −0.80382739 |
| Class B | −0.4106226 |
| Class A | 1.214449999 |

Class B* is clearly recognised as the least preferred software artefact, whilst the other client preference scores have remained the same.

When monitoring changes in software, we can calculate the effective improvement score (EIS) for each relevant change, summarised in Table 19.

TABLE 19

Class B comparison data

| Identifier | Lines of Code | Identifier Length | Construct Complexity | Class Coupling | Maintainability | CPS |
|---|---|---|---|---|---|---|
| Class B− | 120 | 14.67534 | 4.2312 | 6 | 23 | −0.410622 |
| Class B+ | 240 | 10.11 | 2.989 | 2 | 68 | −0.009873 |
| Class B* | 500 | 10.11 | 2.989 | 2 | 68 | −0.841738 |

This example contains two relevant changes from B− to B+ and B− to B* and calculating the Effective Improvement Score (EIS) using the formula given previously, gives EISs as shown in Table 20 below.

TABLE 20

Class B effective improvement scores

| Identifier | | CPS | | | |
|---|---|---|---|---|---|
| Current | Previous | Current | Previous | Evaluation | EIS |
| B+ | B− | −0.009873 | −0.410622 | −0.009873 − −0.410622 | 0.400749 |
| B* | B− | −0.841738 | −0.410622 | −0.841738 − −0.410622 | −0.43112 |

The change B− to B+ has a positive EIS indicating the preferred client option for an improvement to general code quality and developer readability. B− to B* has a negative EIS indicating a poorer-quality change and indicating that the original Class B− was preferable to the client.

The scores indicate that Class B+ is preferable to Class B−, which in turn is preferable to Class B*. The calculations take into account the variance strengths within the software universe dimensions along with the client's preferences. In a commercial environment, large negative values will be of most concern for an organisation reviewing code changes, as they identify those development practices frowned upon, very poor quality code or ideally a combination of the two.

The distillation of many metrics and variance dimensions into a single score provides a simple measure that can be more easily understood by human users and automated algorithms than the original large and complex set of data.

Inconsistent software components lead to difficult to design, build, manage and maintain solutions. The evaluation tool described allows the rapid identification of problematic software artefacts from very large bodies of code, providing improvements to the software management process. Exceptionally large software products (>500,000 lines of code) can be analysed rapidly with committed software changes being incorporated into a software universe in around 30 seconds (this includes loading the data and calculating the universe for that point in time). Areas of complex system growth can be identified and tracked for large numbers of individuals across multiple projects, programming languages and problem domains. These techniques can be utilised by developers looking to improve the code as well as providing critical information for project management, risk identification and developer performance evaluation.

Static analysis through star maps makes it possible to visually compare large volumes of software in a timely and efficient manner, deciding quickly whether software products are high or low quality.

Dynamic analysis through entropy repositories provides a route to automation. Implementation of the described techniques provide 24/7 gate-keepers monitoring the health (entropy) of an organisation's technical capital. Once informed of client preferences, the automation can provide automatic alerts when development changes adversely affect the quality of a given software artefact, advise on software quality and be programmed to deny (or report to a human supervisor) updates resulting in changes that are deemed unsuitable.

A combination of static and dynamic analysis provides a comprehensive way to maintain software and monitor its development.

To further assist with use of the information stored in the software universe, a software management dashboard 140 was developed to visually track the health of a software product's underlying code base, see FIGS. 14 and 15. This tooling provides key performance indicators for many aspects of the software development process. The default screen under the Universe tab 142 provides an overview of the whole lifetime of the project and the impact of the individuals involved in its development. The Maintenance Indicator chart 144 shows the overall ratio of code changes that improve code quality compared with those that do not. The ratio provides a guide to the long-term health of the product. Projects with ratios of 35% and under as shown on indicator 146 become increasingly unmaintainable as time passes.

The Developer Proficiency Profiles display 147 shows how many positive and/or negative Effective Improvement Scores (EIS) changes an individual has made. Negative changes indicate an increase in comprehension effort, not necessarily poor programming. By tracking the actual software changes a user can determine:

1. Which developers are consistently working in difficult to maintain areas of the product and who is primarily carrying out cosmetic work; and 2. Who would benefit from mentoring.

The Volatile Artefacts section 150 identifies where the most change is occurring at a software artefact level as shown by pie chart 151 and its associated data 152. The Active Software Artefacts display 153 classifies the most active software artefacts and who is changing them, with artefacts positioned along the x axis and individual developers positioned along the y axis. For each developer, a circle indicates where the developer has made changes to artefacts with the diameter of the circle increasing as more changes are made by a given developer. For example, large diameter circle 156 shows where a developer has made many changes to one software artefact. A solid vertical line of overlapping circles indicates that many developers are working on the same artefact, see for example line 157 where nearly all developers are working on the same software artefact as compared to line 158 which is broken in several places indicating that some developers have not changed this particular software artefact.

The Developer Commits section 159 displays a pie chart 160 showing the change activity associated with each developer. The 12 Month Activity Review 161 shows which developers are currently affecting the code base, with time shown on the x axis and developers along the y axis. Heat chart 162 showing key developer interactions shows how compatible code changes have been amongst the group during the product's ongoing development. Changes to the code which reduce variance, and so group the code closer to the average artefact in the software universe, are shown in green and changes which increase variance and which expand the universe and would usually be detrimental, are shown in red. A number quantifying the change is also included. Thus entry 170 with a value of 212 represents a very positive change to the software universe from a developer and entry 172 with a red value of −174 represents a change by a different developer that increases variance. This information provides a guide to:

Individuals who work well together;
Which developers have conflicting styles and impair the others code; and
Who would be an ideal mentor for a specific mentee.

Construct specific tabs (for the programming language in question) such as Class 180 and Class Method 182 rank every software artefact using the Effective Improvement Scores 184 and Client Preference Scores 186, see FIG. 15, rapidly identifying the hardest to maintain code of that type.

FIG. 15 shows the dashboard 188 for the Class Method tab 182. There is also a Telescope tab 190 which will be discussed in relation to FIG. 16. For dashboard 188, the Developer Maintainability Impact chart 191 shows each developer's daily aggregate EIS. Identifying abnormal (large negative) changes within the software can be done at a glance. In chart 191 only a handful of changes substantially deviate downwards from the base line at 1 showing negative impact for the development team.

The Developer Low Preference Items display 192 shows which artefacts have been modified by developers over a selected analysis period and how those artefacts are ranked in relation to the client's preferred qualities for their code. The Client Preference Score is shown along the x axis with those artefacts closest to zero CPS representing the preferred type of code with regard to the preferred metrics for that software package. The y axis represents individual developers. Typically developers will be more active on the code closest to zero as this represents easy to modify code. Code furthest from zero is the hardest to understand. The worst ranked artefact in the product, see circle 194, was only changed by a single developer.

Of more concern is expected to be the artefact represented by line 196 as this was changed by many more developers, implying it is affecting many areas of code.

Detailed breakdowns of the Effective Improvement Scores (EIS) and Client Preference Scores (CPS) are shown in the lower part 200 of the screen and show software changes ranked by support effort. The management dashboard 140 has a full set of filtering, sorting and export functionality built in allowing a user to see at least:

Every change ever made, by who and its effect on maintainability;
What artefacts are the best and worst quality for this construct type;
What code changes made the most impact to a ranking score;
What features provide a software artefact's current ranking within the universe;
Which features contribute to a positive or negative change; and
The quality trajectory of an individual artefact over time.

The Telescope tab 190 allows the exploration of the multi-dimensional software universe as generated in the new reference frame based on variance. The stars are colour coded to the CPS rank, green being code most easily understood by the development team and having a CPS rank closest to zero which represents the preferred qualities of the code, see in particular points within region 200 which are predominantly green. Red coloured points identify code of concern. The centre of the universe (shown by a black origin point when you zoom in) and the surrounding area indicates how the team generally develop software and the expected feature ranges of their code and allow the user to see whether 'on average' the code is of superior or inferior quality.

The software universe as displayed in the telescope screen allows rapid identification of problematic software artefacts through outlying red stars, see 202, without reading though the whole code base (often hundreds of thousands of lines of code) or having to define complicated automated rules. Multiple software products can be compared within one universe, allowing comparisons to be drawn between new products and existing software that is already supported. This feature provides an indication of the risk of supporting unknown code, as you can see any discrepancy between development styles.

The main window 204 allows in three dimensions the rotating, zooming, excluding or focusing on specific regions of space. A user can see how inconsistent the universe is by the spread of the stars within it and can slice through a multi-dimensional universe to view a two-dimensional slice or choose to view each dimension in terms of the combination of features in the code that define it. This allows comparisons to be made in the developer's terms, for example complexity, incorrect structure usage, readability and so on. It is easy to inspect what defines a star in the real world and whether the constellation the star belongs to is 'good' or 'bad' code. Points which occupy the same position are coloured blue and are likely to be clones and therefore candidates for refactoring and reuse. Filtering can be performed on any combination of supplied properties of the software, for example complexity v size or readability v decision paths or to compare all four together.

The software universe as described has many potential applications.

Bespoke derived metrics—specific metrics can be defined and analysed in the software universe based on organisational need. A collection of bespoke metrics can define categories of behaviours to monitor, for example Direct Memory Management Calls or Use Of Unsecured APIs and if desired these may form independent dimensions within the universe. These metrics can be heavily weighted making any unwanted behaviours, very visible outliers in the universe.

Bug Databases—a common feature of software development platforms is manually recording bugs and recording failing of automated tests. Each software artefact can be measured for correlations with unexpected behaviours and dimensions appear within a product's software universe exposing indicators for aberrant behaviour. These indicators can be acted upon in the same way as with performance indicators. High priority quality control activity would be driven by low maintainability and high aberrant behaviour.

Code Compliance Measures—tooling which monitors source code's adherence to currently accepted best practice can be incorporated into the underlying features that define a universe and any warnings mapped to the relevant software artefact as a specific category of metric. Outliers in the universe will characterise unusual team behaviour regarding the tooling's measures of preferable code.

Energy Consumption Measures—using the techniques discussed above and including tooling which measures CPU usage, fan activity and battery drain, the extraction process could build an underlying metric suite which supplies an energy feature dimension within the software universe. Support effort could then be prioritised to improve the power efficiency of a software product. Improving efficiency could negatively affect the readability and maintenance of the source code but this would be readily monitored using the dashboards. Additional bug, performance, compliance and resource consumption metrics can be used to define specific feature dimensions within any given software universe.

Code Quality Traffic Lighting—the software universe can be used to assist with teaching developers. The Client Preference Score (CPS) is calculated for a given software artefact and as a developer makes changes an Effective Improvement Score (EIS) is calculated, with a traffic light display showing a green light for an improvement, red otherwise. This provides simple rapid feedback to the developer that they are doing something right or wrong. This type of tooling would allow developers to be aware of how their changes are affecting product code quality, before their work is committed to any revision control system and hence becoming visible to their peers and management.

Rapid Onboarding Pre-Screening—the software universe using EIS and CPS can identify what good quality code looks like according to an organisation. Potential developers can be asked to choose from a variety of code samples to identify individuals with a high preference for the organisations preferred development style.

Predicting Failure Points—by analysing a software artefact's trajectory in the software universe over time, it is possible to see whether the software is trending toward a failure point by projecting a trend line, see FIG. 17. As a universe holds all historical data, the CPS of the artefact can be predicted at the next release date or for more strategic planning in three, six or twelve months' time. By capturing bug incidences for similar scoring artefacts within the universe, predictions can be made for when this decline may make the software too hard to support and maintain.

Software universe pre-sets—large bodies of software can be mined to produce a software universe and third parties can import an extract of their software into this pre-set universe to see how their software compares with the existing software, for example to see whether development styles at different companies are compatible.

The software universe can be created for any programming language, or any combination of languages, as it works with any code metrics. It provides an early warning system for changes that are likely to adversely affect the quality and subsequent maintainability of a software project. Additionally, due to the preference scores, large bodies of change can be promptly ranked. This allows for the identification and corrective prioritization of the poorest changes (large negative values being a cause for concern) made to the code base by the development team. The client preference score allows identification of the most likely candidates for code review, when development resource is limited and only a selection of changes can be reviewed in the time frame available before release.

The software universe can be navigated to provide augmented intelligence for software development, project management and quality control. The software universe shows how similar or dissimilar artefacts within given software solutions are, providing indicators on how comprehensible, extensible and ultimately maintainable the software is likely to be. It can be used to show whether multiple programming styles are present in existing code, to understand how easy maintenance of the code will be, and to review underlying code structure very quickly.

The invention claimed is:

1. A process for evaluating software arranged to take place on a processor or a computing device comprising:
   (i) extracting, by the processor or the computing device, metric data relating to metrics from a plurality of software elements, each metric representing a dimension of a first reference system;
   (ii) undertaking, by the processor or the computing device, principal component analysis of the extracted metric data and creating a second reference system based on variance in the extracted data;
   (iii) calculating, by the processor or the computing device, based on extracted metric data the position of each software element in the second reference system; and
   (iv) displaying, by the processor or the computing device, the position of each software element in the second reference system in a maximum of three dimensions thereby to show in a graphical form the inter-relationship of the software elements to each other.

2. A process according to claim 1, wherein the origin of the second reference system represents an average of the software elements from which the metric data is extracted.

3. A process according to claim 1, wherein two or three of the dominant dimensions achieved from principal component analysis are used, by the processor or the computing device, to display each software element in the second reference system.

4. A process according to claim 1, wherein the position of each software element in the second reference system retains the extracted metric data for examination.

5. A process according to claim 1, wherein the extracted metric data is stored in one or more archives, by the processor or the computing device, before the second reference system is created.

6. A process according to claim 1, wherein the extracted metric data is standardised, by the processor or the computing device, to ensure each metric provides a similar contribution to creating the second reference system.

7. A process according to claim 1, further comprising producing, by the processor or the computing device, a static graph in three dimensions which is navigable to allow investigation of individual software elements positioned in the second reference system.

8. A process according to claim 1, further comprising undertaking, by the processor or the computing device, a dynamic analysis of changes in software over time.

9. A process according to claim 8, wherein one or more entropy repositories are used, by the processor or the computing device, to hold metric data so as to monitor movement over time of software elements within the second reference system.

* * * * *